(12) United States Patent
Owada et al.

(10) Patent No.: US 11,841,067 B2
(45) Date of Patent: Dec. 12, 2023

(54) TRANSMISSION STRUCTURE

(71) Applicant: Kanzaki Kokyukoki Mfg. Co., Ltd., Amagasaki (JP)

(72) Inventors: Kazuhiro Owada, Amagasaki (JP); Koji Iwaki, Amagasaki (JP)

(73) Assignee: Kanzaki Kokyukoki Mfg. Co., LTD, Amagasaki (JP)

( * ) Notice: Subject to any disclaimer, the term of this patent is extended or adjusted under 35 U.S.C. 154(b) by 110 days.

(21) Appl. No.: 17/635,323

(22) PCT Filed: Aug. 6, 2020

(86) PCT No.: PCT/JP2020/030200
§ 371 (c)(1),
(2) Date: Jul. 5, 2022

(87) PCT Pub. No.: WO2021/029323
PCT Pub. Date: Feb. 18, 2021

(65) Prior Publication Data
US 2023/0220910 A1 Jul. 13, 2023

(30) Foreign Application Priority Data

Aug. 15, 2019 (JP) .............................. 2019-148996
Nov. 12, 2019 (JP) .............................. 2019-204624

(51) Int. Cl.
*F16H 61/47* (2010.01)
*F16H 47/04* (2006.01)
*F16H 59/44* (2006.01)

(52) U.S. Cl.
CPC ............ *F16H 47/04* (2013.01); *F16H 59/44* (2013.01); *F16H 61/47* (2013.01)

(58) Field of Classification Search
CPC .......... F16H 47/04; F16H 59/44; F16H 61/47; F16H 2037/0886; B60Y 2200/221
See application file for complete search history.

(56) References Cited

U.S. PATENT DOCUMENTS

2011/0178684 A1* 7/2011 Umemoto ............... F16H 61/47
477/115

FOREIGN PATENT DOCUMENTS

CN 101025233 B * 8/2010 ........... F16H 61/423
EP 1745972 A1 * 1/2007 ............. B60K 17/08

(Continued)

OTHER PUBLICATIONS

International Search Report issued in International application No. PCT/JP2020/030200, dated Nov. 2, 2020, 5 pages.

*Primary Examiner* — Justin Holmes
(74) *Attorney, Agent, or Firm* — Sterne, Kessler, Goldstein & Fox P.L.L.C.

(57) ABSTRACT

A transmission structure of the present invention changes capacity of pump body so that vehicle speed detected by vehicle speed sensor increases and reduces according to speed-increasing and speed-reducing operations of speed-change operating member while fixing capacity of motor body at a low-speed motor capacity when the vehicle speed is equal to or lower than a switching speed that is realized by setting motor body to the low-speed motor capacity and setting the pump body to a predetermined pump switching capacity, and changes capacity of motor body so that vehicle speed increases and reduces in accordance with speed-increasing and speed-reducing operations of speed-change operating member while fixing capacity of the pump body at the pump switching capacity when vehicle speed is higher than the switching speed.

20 Claims, 16 Drawing Sheets

(56) References Cited

FOREIGN PATENT DOCUMENTS

| JP | S50-136571 A | 10/1975 |
| JP | H08-282311 A | 10/1996 |
| JP | H11-108152 A | 4/1999 |
| JP | 2000-130558 A | 5/2000 |
| JP | 2003-104075 A | 4/2003 |
| JP | 2006-007819 A | 1/2006 |
| JP | 2010-076748 A | 4/2010 |

* cited by examiner

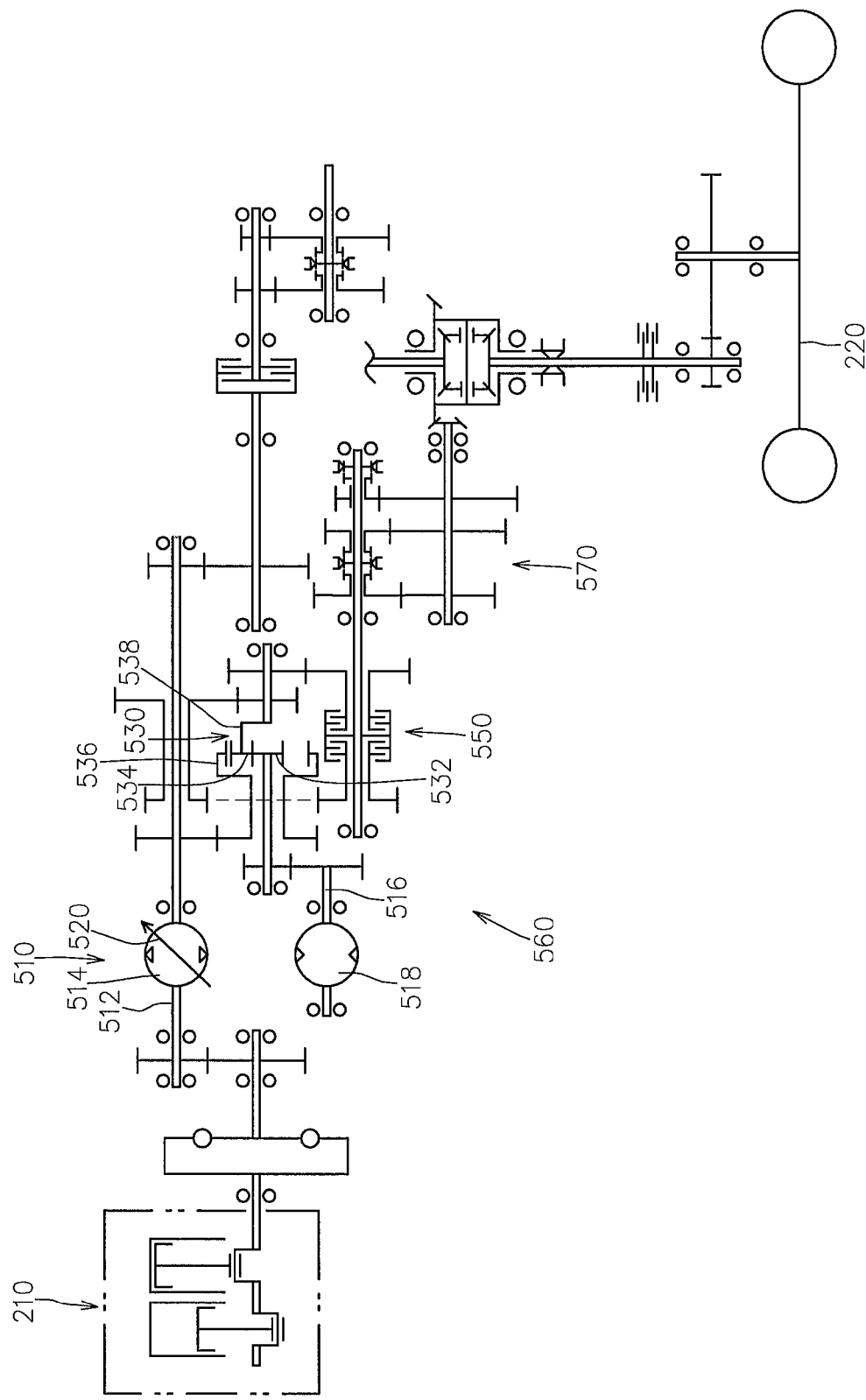

TRANSMISSION STRUCTURE

FIELD OF THE INVENTION

The present invention relates to a transmission structure having a hydro-mechanical transmission (HMT) that includes a hydrostatic transmission (HST) and a planetary gear mechanism.

BACKGROUND ART

A transmission structure including an HMT that is formed by an HST and a planetary gear mechanism is described, for example, in Patent Literature 1, and is preferably used in a traveling-system power-transmitting path of work vehicles such as combine harvesters and tractors.

FIG. 14 shows a transmission schematic diagram of a work vehicle to which a conventional transmission structure 500 described in Patent Literature 1 above is applied.

As shown in FIG. 14, the above transmission structure 500 has an HST 510 and a planetary gear mechanism 530.

The HST 510 has a pump shaft 512 that operatively receives a rotary power from a driving source 210 of the work vehicle, a pump body 514 supported on the pump shaft 512, a pump-side output adjusting member 520 that continuously varies a capacity of the pump body 514, a motor shaft 516 that outputs an HST output, and a motor body 518 that is supported on the motor shaft 516 and is fluidly connected to the pump body 514; and the HST 510 is configured so that, with the motor body 518 in a state of having a fixed capacity, changing the capacity of the pump body 514 with the pump-side output adjusting member 520 can continuously vary the rotation speed of the motor shaft 516 relative to the rotation speed of the pump shaft 512.

The planetary gear mechanism 530 has a sun gear 532, a planetary gear 534 that meshes with the sun gear 532, an internal gear 536 that meshes with the planetary gear 534, and a carrier 538 that supports the planetary gear 534 rotatably around an axial line and rotates around the same axial line as the sun gear 532 in conjunction with a revolution of the planetary gear 534 around the sun gear 532; and the sun gear 532, the carrier 538, and the internal gear 536 form three planetary elements.

As shown in FIG. 14, in the conventional transmission structure 500, a reference rotational power from the driving source 210 is operatively input to the internal gear 536, and the HST output from the motor shaft 516 is operatively input to the sun gear 532, and a combined rotational power, which is made by combining the reference rotational power and the HST output, is output from the carrier 538.

By the way, a required maximum towing force and a required maximum vehicle traveling speed of the work vehicle are defined according to the specification, and the above transmission structure is required to cover the required maximum towing force and the required maximum vehicle traveling speed.

FIG. 15 shows the relation between a required maximum towing force Tmax and a required maximum vehicle traveling speed Smax with respect to an HST capacity (HST pump capacity) in an example of the work vehicle to which the conventional transmission structure 500 is applied.

Here, in the above conventional transmission structure 500, the HST 510 is so made that the capacity of the motor body 518 is fixed, and only the capacity of the pump body 514 is variable, and changing the capacity of the pump body 514 changes the rotation speed of the HST output.

However, it is difficult to cover the range of the required maximum towing force Tmax and the required maximum vehicle traveling speed Smax only with a speed-change range of the HST output rotation speed.

Therefore, as shown in FIG. 14, the conventional transmission structure 500 is provided with an auxiliary speed-change mechanism 570 that changes, in multiple speed-change stages, the speed of the combined rotational power output from the planetary gear mechanism 530, that is, the HMT output, and outputs a rotational power whose speed has been changed to a driving wheel 220, and is configured so as to cover the required maximum towing force Tmax and the required maximum vehicle traveling speed Smax by setting the number of speed-change stages of the auxiliary speed-change mechanism 570 to three stages.

A reference numeral 550 in FIG. 14 is a forward/rearward switching mechanism.

FIGS. 16A to 16C show the relation between the vehicle traveling speed and the towing force with respect to the HST capacity (HST pump capacity) in the state where the auxiliary speed-change mechanism 570 is set to a low-speed transmission state, a medium-speed transmission state, and a high-speed transmission state, respectively, in the work vehicle to which the conventional transmission structure 500 is applied.

As shown in FIG. 15 and FIGS. 16A to 16C, in the example of FIG. 14, the three speed-change stages including the first speed (low speed), the second speed (middle speed), and the third speed (high speed) stages provided in the above auxiliary speed-change mechanism 570 cover the range of the required maximum towing force Tmax and the required maximum vehicle traveling speed Smax.

Further, the conventional transmission structure is provided with the forward/rearward switching mechanism 550 separately from the HST 510 and the planetary gear mechanism 530, and is configured so that the forward/rearward switching mechanism 550 switches a forward rotational power output and a rearward rotational power output of the work vehicle.

PRIOR ART DOCUMENT

Patent Literature

Patent Literature 1: Japanese Unexamined Patent Application Laid-Open No. 2010-076748.

SUMMARY OF THE INVENTION

The present invention has been made in view of the above conventional technology, and has a first object of providing a transmission structure having an HST and a planetary gear mechanism that form an HMT, and capable of expanding the speed-changeable range of an output of the HMT.

In order to achieve the first object, a first aspect of the present invention provides a transmission structure interposed in a traveling-system power-transmitting path of a work vehicle, including an HST that includes a pump shaft operatively receiving a rotational power from a driving source provided in the work vehicle, a pump body supported by the pump shaft, a pump-side output adjusting member continuously varying a capacity of the pump body between first and second pump capacities, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity; a planetary gear mechanism that includes first to three elements and that is configured to combine a reference rotational power operatively transmitted from the driving source to the first element and an HST output operatively transmitted from the motor shaft to the second element and output a combined rotational power from the third element, the planetary gear mechanism being set so that the speed of the combined rotational power output from the third element is increased as the HST output is varied in accordance with the change of the capacity of the pump body from the first pump capacity to the second pump capacity; a manually operable speed-change operating member; a vehicle traveling speed sensor that directly or indirectly detects a vehicle traveling speed of the work vehicle; a pump sensor that directly or indirectly detects the capacity of the pump body; a motor sensor that directly or indirectly detects the capacity of the motor body; and a control device that executes operation control of the pump-side output adjusting member and the motor-side output adjusting member. In the first aspect, when the vehicle traveling speed detected by the vehicle traveling speed sensor is equal to or lower than a switching speed that is realized by the motor body being set to the low-speed motor capacity and the pump body being set to a predetermined pump switching capacity, the control device operates the pump-side output adjusting member so that the vehicle traveling speed increases and reduces in accordance with speed-increasing and speed-reducing operations of the speed-change operating member while operating the motor-side output adjusting member so that the motor body is fixed at the low-speed motor capacity; and when the vehicle traveling speed is higher than the switching speed, the control device operates the motor-side output adjusting member so that the vehicle traveling speed increases and reduces in accordance with the speed-increasing and speed-reducing operations of the speed-change operating member while operating the pump-side output adjusting member so that the pump body is fixed at the pump switching capacity.

The transmission structure according to the first aspect makes it possible to expand the speed-changeable range of the output of the HMT formed by the HST and the planetary gear mechanism without causing a rapid speed change.

Therefore, for example, in a case where a multi speed-change stage auxiliary speed-change mechanism is provided, the transmission structure according to the first aspect can reduce a number of speed-change stages in the auxiliary speed-change mechanism in comparison with a number of speed-change stages in the auxiliary speed-change mechanism to be needed in a conventional transmission structure.

In order to achieve the first object, a second aspect of the present invention provides a transmission structure interposed in a traveling-system power-transmitting path of a work vehicle, including an HST that includes a pump shaft operatively receiving a rotational power from a driving source provided in the work vehicle, a pump body supported by the pump shaft, a pump-side output adjusting member continuously varying a capacity of the pump body between first and second pump capacities, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity; a planetary gear mechanism that includes first to three elements and that is configured to combine a reference rotational power operatively transmitted from the driving source to the first element and an HST output operatively transmitted from the motor shaft to the second element and output a combined rotational power from the third element, the planetary gear mechanism being set so that the speed of the combined rotational power output from the third element is increased as the HST output is varied in accordance with the change of the capacity of the pump body from the first pump capacity to the second pump capacity; a manually operable speed-change operating member; a vehicle traveling speed sensor that directly or indirectly detects a vehicle traveling speed of the work vehicle; a pump sensor (130) that directly or indirectly detects the capacity of the pump body; a motor sensor that directly or indirectly detects the capacity of the motor body; and a control device that executes operation control of the pump-side output adjusting member and the motor-side output adjusting member. In the second aspect, when the vehicle traveling speed detected by the vehicle traveling speed sensor is equal to or lower than a switching speed that is realized by the motor body being set to the low-speed motor capacity and the pump body being set to a predetermined pump switching capacity between the first and second pump capacities, the control device operates the pump-side output adjusting member so that the vehicle traveling speed increases and reduces in accordance with the speed-increasing and speed-reducing operations of the speed-change operating member while operating the motor-side output adjusting member so that the motor body is fixed at the low-speed motor capacity; and when the vehicle traveling speed is higher than the switching speed, the control device synchronously executes speed-increasing operations of the pump-side output adjusting member and the motor-side output adjusting member in accordance with the speed-increasing operation of the speed-change operating member and also synchronously executing speed-reducing operations of the pump-side output adjusting member and the motor-side output adjusting member in accordance with the speed-reducing operation of the speed-change operating member, wherein the speed-increasing operation of the pump-side output adjusting member changes the capacity of the pump body from the side of the pump switching capacity to the side of the second pump capacity, the speed-increasing operation of the motor-side output adjusting member changes the capacity of the motor body from the side of the low-speed motor capacity to the side of the high-speed motor capacity, the speed-reducing operation of the pump-side output adjusting member changes capacity of the pump body from the side of the second pump capacity to the side of the pump switching capacity, and the speed-reducing operation of the motor-side output adjusting member changes the capacity of the motor body from the side of the high-speed motor capacity to the side of the low-speed motor capacity.

In a preferable embodiment of the second aspect, the pump switching capacity is set to a neutral capacity that makes the rotation of the motor shaft zero regardless of the rotation state of the pump shaft.

In order to achieve the first object, a third aspect of the present invention provides a transmission structure interposed in a traveling-system power-transmitting path of a work vehicle, including an HST that includes a pump shaft operatively receiving a rotational power from a driving source provided in the work vehicle, a pump body supported by the pump shaft, a pump-side output adjusting member continuously varying a capacity of the pump body between first and second pump capacities, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity; a planetary gear mechanism that includes first to three elements and that is configured to combine a reference rotational power operatively transmitted from the driving source to the first element and an HST output operatively transmitted from the motor shaft to the second element and output a combined rotational power from the third element, the planetary gear mechanism being set so that the speed of the combined rotational power output from the third element is increased as the HST output is varied in accordance with the change of the capacity of the pump body from the first pump capacity to the second pump capacity; a manually operable speed-change operating member; a vehicle traveling speed sensor that directly or indirectly detects a vehicle traveling speed of the work vehicle; a pump sensor that directly or indirectly detects the capacity of the pump body; a motor sensor that directly or indirectly detects the capacity of the motor body; and a control device that executes operation control of the pump-side output adjusting member and the motor-side output adjusting member. In the third aspect, when the vehicle traveling speed detected by the vehicle traveling speed sensor is lower than a switching speed that is realized by the motor body being set to the low-speed motor capacity and the pump body being set to a predetermined pump switching capacity, the control device operates the pump-side output adjusting member so that the vehicle traveling speed increases and reduces in accordance with the speed-increasing and speed-reducing operations of the speed-change operating member while operating the motor-side output adjusting member so that the motor body is fixed at the low-speed motor capacity; when the vehicle traveling speed reaches the switching speed from the low-speed side, the control device operates the motor-side output adjusting member so that the capacity of the motor body changes from the low-speed motor capacity to the high-speed motor capacity and operates, at the same time, the pump-side output adjusting member so that the capacity of the pump body becomes a pump adjusting capacity that can maintain the vehicle traveling speed at the switching speed in the state of the motor body being set to the high-speed motor capacity; when the vehicle traveling speed is higher than the switching speed, the control device operates the pump-side output adjusting member so that the vehicle traveling speed increases and reduces in accordance with the speed-increasing and speed-reducing operations of the speed-change operating member while operating the motor-side output adjusting member so that the motor body is fixed at the high-speed motor capacity; and when the vehicle traveling speed reaches the switching speed from the high-speed side, the control device operates the motor-side output adjusting member so that the capacity of the motor body changes from the high-speed motor capacity to the low-speed motor capacity and operates, at the same time, the pump-side output adjusting member so that the capacity of the pump body changes from the pump adjusting capacity to the pump switching capacity.

In a preferable embodiment of the first and third aspects, the pump switching capacity is set to the second pump capacity.

The transmission structure according to any one of the first to third aspects may further include a forward/rearward switching mechanism capable of selectively taking a forward transmission state of outputting the combined rotational power operatively transmitted from the third element as a rotational power for a vehicle forward movement and a rearward transmission state of outputting the combined rotational power as a rotational power for a vehicle rearward movement.

In this case, the planetary gear mechanism is so set that the rotational speed of the output of the third element becomes zero speed when the pump body is set to a predetermined planetary zero output capacity with the motor body being set to the low-speed motor capacity, and the output of the third element increases in one direction around an axial line as the capacity of the pump body is changed from the planetary zero output capacity to the second pump capacity.

Then, the control device operates the pump-side output adjusting member so that the pump body has the planetary zero output capacity while operating the motor-side output adjusting member so that the motor body has the low-speed motor capacity when the speed-change operating member is positioned in the zero speed position.

In a preferable configuration, the planetary zero output capacity is set to the first pump capacity.

In one embodiment, the speed-change operating member is configured so as to be operated from the zero speed position to forward and rearward sides.

In this embodiment, the control device operates the forward/rearward switching mechanism so as to take the forward and rearward transmission states, respectively, in accordance with the operations of the speed-change operating member from the zero speed position to forward and rearward sides.

In another embodiment, the transmission structure is provided with a manually operable forward/rearward switch operating member.

In this embodiment, the control device operates the forward/rearward switching mechanism so as to take the forward and rearward transmission states in accordance with the operation of the forward/rearward switch operating member.

In place of provision of the forward/rearward switching mechanism, the HST may be configured so that the motor shaft rotates in the forward and rearward directions with respect to the rotational direction of the pump shaft when the pump body is set to the first and second pump capacities, respectively, and the rotation of the motor shaft is made zero regardless of the rotation state of the pump shaft when the pump body is set to a neutral capacity, and then, the planetary gear mechanism may be set so that the rotational speed of the output of the third element becomes zero speed when the pump body is set to the planetary zero output capacity between the first pump capacity and the neutral capacity with the motor body being set to the low-speed motor capacity, the rotational speed of the output of the third element increases in the forward side as the capacity of the pump body is changed from the planetary zero output capacity to the second pump capacity, and the rotational speed of the output of the third element increases in the rearward side as the capacity of the pump body is changed from the planetary zero output capacity to the first pump capacity.

The configuration makes it possible to expand the speed-changeable range of the output of the HMT in a state capable of switching between the forward and rearward transmission states without provision of the forward/rearward switching mechanism.

Also, the present invention has a second object of providing a transmission structure having an HST and a planetary gear mechanism that form an HMT, and capable of expanding the speed-changeable range of an output of the HMT in a state capable of switching between forward and rearward transmission states without provision of a forward/rearward switching mechanism.

In order to achieve the second object, a fourth aspect of the present invention provides a transmission structure interposed in a traveling-system power-transmitting path of a work vehicle, including an HST that includes a pump shaft operatively receiving a rotational power from a driving source provided in the work vehicle, a pump body supported by the pump shaft, a pump-side output adjusting member continuously varying a capacity of the pump body, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity; a planetary gear mechanism that includes first to three elements and that is configured to combine a reference rotational power operatively transmitted from the driving source to the first element and an HST output operatively transmitted from the motor shaft to the second element and output a combined rotational power from the third element; a manually operable speed-change operating member; a vehicle traveling speed sensor that directly or indirectly detects a vehicle traveling speed of the work vehicle; a pump sensor that directly or indirectly detects the capacity of the pump body; a motor sensor that directly or indirectly detects the capacity of the motor body; and a control device that executes operation control of the pump-side output adjusting member and the motor-side output adjusting member, wherein pump-side output adjusting member is configured so as to continuously vary the capacity of the pump body between first and second pump capacities with a neutral capacity being interposed therebetween, the neutral capacity making the rotation of the motor shaft zero regardless of the rotation state of the pump shaft, the first pump capacity being one of a forward rotation side that causes the motor shaft to rotate in a forward direction with respect to the rotational direction of the pump shaft and a reverse rotation side that causes the motor shaft to rotate in a reverse direction with respect to the rotational direction of the pump shaft, the second pump capacity being the other of the forward and reverse rotation sides, wherein the planetary gear mechanism is so set that the rotational speed of the output of the third element becomes zero speed when the pump body is set to a planetary zero output capacity between the first pump capacity and the neutral capacity with the motor body being set to the low-speed motor capacity, the rotational speed of the output of the third element increases in the forward side as the capacity of the pump body is changed from the planetary zero output capacity via the neutral capacity to the second pump capacity, and the rotational speed of the output of the third element increases in the rearward side as the capacity of the pump body is changed from the planetary zero output capacity to the first pump capacity. In the fourth aspect of the present invention, when the speed-change operating member is positioned in a zero speed position, the control device operates the motor-side output adjusting member so that the motor body becomes the low-speed motor capacity while operating the pump-side output adjusting member so that the pump body has the planetary zero output capacity; when the vehicle traveling speed detected by the vehicle traveling speed sensor is equal to or lower than a forward-side switching speed that is realized by the motor body being set to the low-speed motor capacity and the pump body being set to a predetermined forward-side pump switching capacity, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the low-speed motor capacity; when the vehicle traveling speed is higher than the forward-side switching speed, in the case where the speed-change operating member is operated from the zero speed position to the forward side, the control device operates the motor-side output adjusting member so that the vehicle traveling speed increases and reduces in the forward side in accordance with the forward-side speed-increasing and forward-side speed-reducing operations of the speed-change operating member while operating the pump-side output adjusting member so that the pump body is fixed at the forward-side pump switching capacity; and when the speed-change operating member is operated from the zero speed position to the rearward side, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity.

The transmission structure according to the fourth aspect makes it possible to switch between the forward and rearward transmission states without provision of a forward/rearward switching mechanism, and also expand the speed-changeable range of the output of the HMT formed by the HST and the planetary gear mechanism without causing a rapid speed change.

Therefore, for example, in a case where a multi speed-change stage auxiliary speed-change mechanism is provided, the transmission structure according to the fourth aspect can reduce a number of speed-change stages in the auxiliary speed-change mechanism in comparison with a number of speed-change stages in the auxiliary speed-change mechanism to be needed in a conventional transmission structure.

In order to achieve the second object, a fifth aspect of the present invention provides a transmission structure interposed in a traveling-system power-transmitting path of a work vehicle, including an HST that includes a pump shaft operatively receiving a rotational power from a driving source provided in the work vehicle, a pump body supported by the pump shaft, a pump-side output adjusting member continuously varying a capacity of the pump body, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity; a planetary gear mechanism that includes first to three elements and that is configured to combine a reference rotational power operatively transmitted from the driving source to the first element and an HST output operatively transmitted from the motor shaft (16) to the second element and output a combined rotational power from the third element; a manually operable speed-change operating member; a vehicle traveling speed sensor that directly or indirectly detects a vehicle traveling speed of the work vehicle; a pump sensor that directly or indirectly detects the capacity of the pump body; a motor sensor that directly or indirectly detects the capacity of the motor body; and a control device that executes operation control of the pump-side output adjusting member and the motor-side output adjusting member, wherein pump-side output adjusting member is configured so as to continuously vary the capacity of the pump body between first and second pump capacities with a neutral capacity being interposed therebetween, the neutral capacity making the rotation of the motor shaft zero regardless of the rotation state of the pump shaft, the first pump capacity being one of a forward rotation side that causes the motor shaft to rotate in a forward direction with respect to the rotational direction of the pump shaft and a reverse rotation side that causes the motor shaft to rotate in a reverse direction with respect to the rotational direction of the pump shaft, the second pump capacity being the other of the forward and reverse rotation sides, and wherein the planetary gear mechanism is so set that the rotational speed of the output of the third element becomes zero speed when the pump body is set to a planetary zero output capacity between the first pump capacity and the neutral capacity with the motor body being set to the low-speed motor capacity, the rotational speed of the output of the third element increases in the forward side as the capacity of the pump body is changed from the planetary zero output capacity via the neutral capacity to the second pump capacity, and the rotational speed of the output of the third element increases in the rearward side as the capacity of the pump body is changed from the planetary zero output capacity to the first pump capacity. In the fifth aspect of the present invention, when the speed-change operating member is positioned in a zero speed position, the control device operates the motor-side output adjusting member so that the motor body has the low-speed motor capacity while operating the pump-side output adjusting member so that the pump body has the planetary zero output capacity; when the vehicle traveling speed detected by the vehicle traveling speed sensor is equal to or lower than a forward-side switching speed that is realized by the motor body being set to the low-speed motor capacity and the pump body being set to a predetermined forward-side pump switching capacity, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body (18) is fixed at the low-speed motor capacity; when the vehicle traveling speed is higher than the forward-side switching speed in the case where the speed-change operating member is operated from the zero speed position to the forward side, the control device synchronously executes a forward-side speed-increasing operation of the pump-side output adjusting member and a speed-increasing operation of the motor-side output adjusting member in accordance with the forward-side speed-increasing operation of the speed-change operating member while synchronously executing forward-side speed-reducing operation of the speed-change operating member and a speed-reducing operation of the motor-side output adjusting member in accordance with the forward-side speed-reducing operation of the speed-change operating member, wherein the forward-side speed-increasing operation of the pump-side output adjusting member changes the capacity of the pump body from the side of the forward-side pump switching capacity to the side of the second pump capacity, the speed-increasing operation of the motor-side output adjusting member changes the capacity of the motor body from the side of the low-speed motor capacity to the side of the high-speed motor capacity, the forward-side speed-reducing operation of the pump-side output adjusting member changes the capacity of the pump body from the side of the second pump capacity to the side of the forward-side pump switching capacity, and the speed-reducing operation of the motor-side output adjusting member changes the capacity of the motor body from the side of the high-speed motor capacity to the side of the low-speed motor capacity; and when the speed-change operating member is operated from the zero speed position to the rearward side, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity.

In a preferable configuration of the fifth aspect, the pump switching capacity is set to the neutral capacity.

In order to achieve the second object, a sixth aspect of the present invention provides a transmission structure interposed in a traveling-system power-transmitting path of a work vehicle, including an HST that includes a pump shaft operatively receiving a rotational power from a driving source provided in the work vehicle, a pump body supported by the pump shaft, a pump-side output adjusting member continuously varying a capacity of the pump body, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity; a planetary gear mechanism that includes first to three elements and that is configured to combine a reference rotational power operatively transmitted from the driving source to the first element and an HST output operatively transmitted from the motor shaft to the second element and output a combined rotational power from the third element; a manually operable speed-change operating member; a vehicle traveling speed sensor that directly or indirectly detects a vehicle traveling speed of the work vehicle; a pump sensor that directly or indirectly detects the capacity of the pump body; a motor sensor that directly or indirectly detects the capacity of the motor body; and a control device that executes operation control of the pump-side output adjusting member and the motor-side output adjusting member, wherein pump-side output adjusting member is configured so as to continuously vary the capacity of the pump body between first and second pump capacities with a neutral capacity being interposed therebetween, the neutral capacity making the rotation of the motor shaft zero regardless of the rotation state of the pump shaft, the first pump capacity being one of a forward rotation side that causes the motor shaft to rotate in a forward direction with respect to the rotational direction of the pump shaft and a reverse rotation side that causes the motor shaft to rotate in a reverse direction with respect to the rotational direction of the pump shaft, the second pump capacity being the other of the forward and reverse rotation sides, and wherein the planetary gear mechanism is so set that the rotational speed of the output of the third element becomes zero speed when the pump body is set to a planetary zero output capacity between the first pump capacity and the neutral capacity with the motor body being set to the low-speed motor capacity, the rotational speed of the output of the third element increases in the forward side as the capacity of the pump body is changed from the planetary zero output capacity via the neutral capacity to the second pump capacity, and the rotational speed of the output of the third element increases in the rearward side as the capacity of the pump body is changed from the planetary zero output capacity to the first pump capacity. In the sixth aspect of the present invention, when the speed-change operating member is positioned in a zero speed position, the control device operates the motor-side output adjusting member so that the motor body has the low-speed motor capacity while operating the pump-side output adjusting member so that the pump body has the planetary zero output capacity; when the vehicle traveling speed detected by the vehicle traveling speed sensor is equal to or lower than a forward-side switching speed that is realized by the motor body being set to the low-speed motor capacity and the pump body being set to a predetermined forward-side pump switching capacity, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the low-speed motor capacity; when the vehicle traveling speed reaches the forward-side switching speed from the low-speed side, in a case where the speed-change operating member is operated from the zero speed position to the forward side, the control device operates the motor-side output adjusting member so that the capacity of the motor body changes from the low-speed motor capacity to the high-speed motor capacity and operating, at the same time, the pump-side output adjusting member so that the capacity of the pump body becomes a forward-side pump adjusting capacity that can maintain the vehicle traveling speed at the forward-side switching speed in a state of the motor body being set to the high-speed motor capacity; when the vehicle traveling speed is higher than the forward-side switching speed, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the high-speed motor capacity; when the vehicle traveling speed reaches the forward-side switching speed from the high-speed side, in a case where the speed-change operating member is operated from the zero speed position to the forward side, the control device operates the motor-side output adjusting member so that the capacity of the motor body changes from the high-speed motor capacity to the low-speed motor capacity and operating, at the same time, the pump-side output adjusting member so that the capacity of the pump body changes from the pump adjusting capacity to the pump switching capacity; and when the speed-change operating member is operated to the rearward side, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity.

In a preferable configuration of the fourth and sixth aspect, the forward-side pump switching capacity is set to the second pump capacity.

In a preferable embodiment of the transmission structure according to any one of the fourth to sixth aspects, when the vehicle traveling speed is equal to or lower than the rearward-side switching speed that is realized by the motor body being set to the low-speed motor capacity and the pump body being set to a predetermined rearward-side pump switching capacity, in a case where the speed-change operating member is operated from the zero speed position to the rearward, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity; and when the vehicle traveling speed is higher than the rearward-side switching speed, in a case where the speed-change operating member is operated from the zero speed position to the rearward, the control device operates the motor-side output adjusting member so that the vehicle traveling speed increases and reduces in the rearward side in accordance with the rearward-side speed-increasing and rearward-side speed-reducing operations of the speed-change operating member while operating the pump-side output adjusting member so that the pump body is fixed at the rearward-side pump switching capacity.

In another embodiment, when the vehicle traveling speed is equal to or lower than the rearward-side switching speed that is realized by the motor body being set to the low-speed motor capacity and the pump body being set to a predetermined rearward-side pump switching capacity, in a case where the speed-change operating member is operated from the zero speed position to the rearward, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity; and when the vehicle traveling speed is higher than the rearward-side switching speed, in a case where the speed-change operating member is operated from the zero speed position to the rearward, the control device synchronously performs the rearward-side speed-increasing operation of the pump-side output adjusting member and the speed-increasing operation of the motor-side output adjusting member in accordance with the rearward-side speed-increasing operation of the speed-change operating member while synchronously performs the rearward-side speed-reducing operation of the pump-side output adjusting member and the speed-reducing operation of the motor-side output adjusting member in accordance with the rearward-side speed-reducing operation of the speed-change operating member, the rearward-side speed-increasing operation of the pump-side output adjusting member changing the capacity of the pump body from the side of the rearward-side pump switching capacity to the side of the first pump capacity, the speed-increasing operation of the motor-side output adjusting member changing the capacity of the motor body from the side of the low-speed motor capacity to the side of the high-speed motor capacity, the rearward-side speed-reducing operation of the pump-side output adjusting member changing the capacity of the pump body from the side of the first pump capacity to the side of the rearward-side pump switching capacity, the speed-reducing operation of the motor-side output adjusting member changing the capacity of the motor body from the side of the high-speed motor capacity to the side of the low-speed motor capacity.

In still another embodiment, in a case where the speed-change operating member is operated from the zero speed position to the rearward, when the vehicle traveling speed is equal to or lower than the rearward-side switching speed that is realized by the motor body being set to the low-speed motor capacity and the pump body being set to a predetermined rearward-side pump switching capacity, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity; when the vehicle traveling speed reaches the rearward-side switching speed from the low-speed side, the control device operates the motor-side output adjusting member so that the capacity of the motor body changes from the low-speed motor capacity to the high-speed motor capacity, and operates, at the same time, the pump-side output adjusting member so that the capacity of the pump body becomes a rearward-side pump adjusting capacity that can maintain the vehicle traveling speed at the rearward-side switching speed in a state of the motor body being set to the high-speed motor capacity; when the vehicle traveling speed is higher than the rearward-side switching speed, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the high-speed motor capacity; and when the vehicle traveling speed reaches the rearward-side switching speed from the high-speed side, the control device operates the motor-side output adjusting member so that the capacity of the motor body changes from the high-speed motor capacity to the low-speed motor capacity, and operates, at the same time, the pump-side output adjusting member so that the capacity of the pump body changes from the rearward-side pump adjusting capacity to the rearward-side pump switching capacity.

In a preferable configuration, the rearward-side pump switching capacity is set to the first pump capacity.

The transmission structure according to any one of the first to sixth aspects preferably may further include an auxiliary speed-change mechanism that changes, in multiple speed-change stages, the speed of the rotational power operatively transmitted from the third element.

BRIEF DESCRIPTION OF THE DRAWINGS

FIG. 14 is a transmission schematic diagram of a work vehicle to which a conventional transmission structure is applied.

EMBODIMENT FOR CARRYING OUT THE INVENTION

First Embodiment

An embodiment of a transmission structure according to the present invention will be described below with reference to the accompanying drawings.

Figure 1:
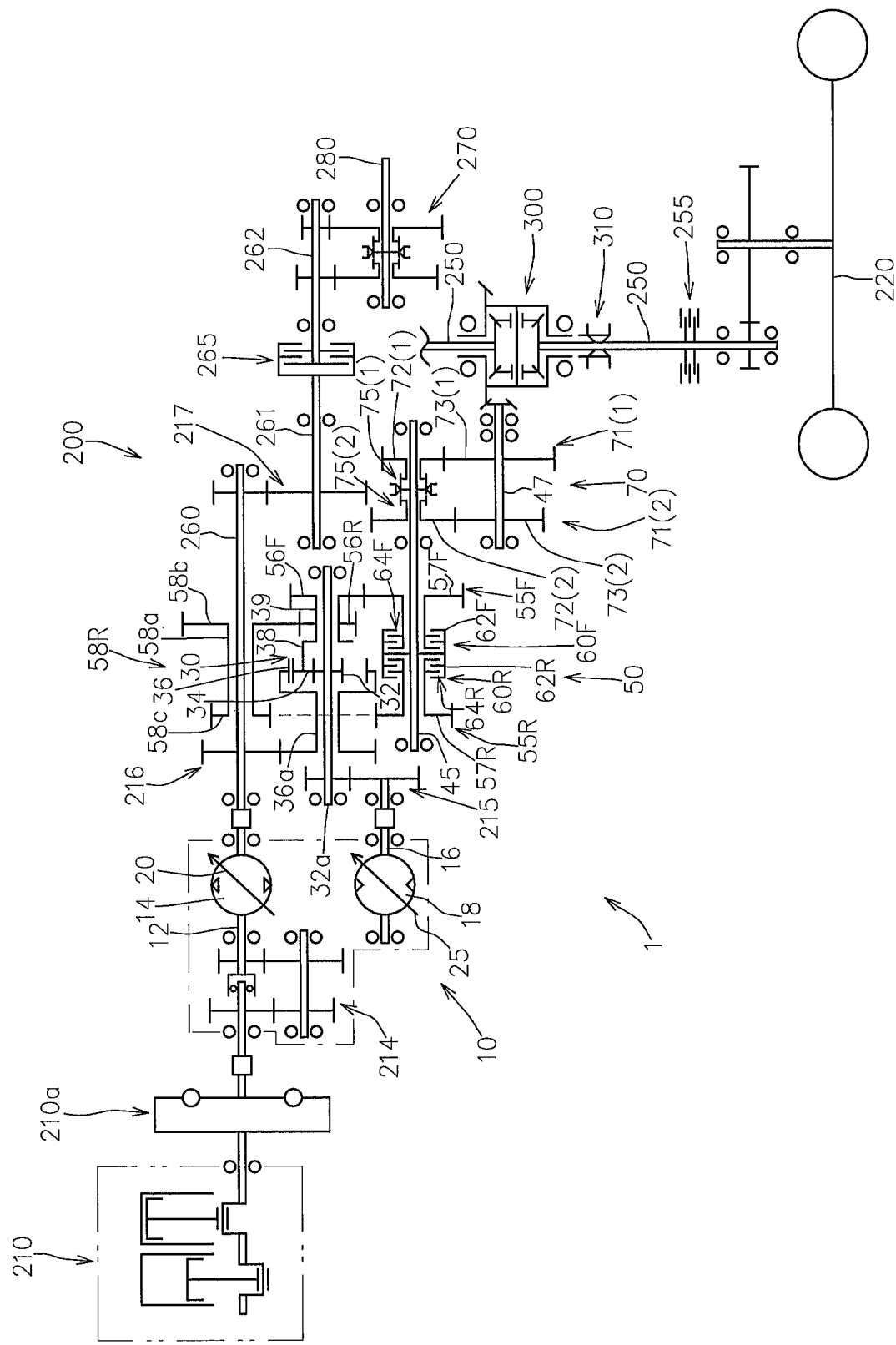
FIG. 1 is a transmission schematic diagram of a work vehicle to which a transmission structure according to a first embodiment of the present invention is applied.

FIG. 1 shows a transmission schematic diagram of a work vehicle 200 to which a transmission structure 1 according to the present embodiment is applied.

As shown in FIG. 1, the work vehicle 200 has a driving source 210, driving wheels 220, and the transmission structure 1 interposed in a traveling-system power-transmitting path from the driving source 210 to the driving wheels 220. A reference numeral 210a in FIG. 1 is a flywheel included in the above driving source 210.

As shown in FIG. 1, the transmission structure 1 includes a Hydro-Static-Transmission (HST) 10, and a planetary gear mechanism 30 that cooperates with the HST 10 thereby to form a Hydro-Mechanical-Transmission (HMT).

The HST 10 has a pump shaft 12 that operatively inputs a rotational power from the driving source 210, a pump body 14 supported by the pump shaft 12, a pump-side output adjusting member 20 that can continuously vary the capacity of the pump body 14, a motor shaft 16, a motor body 18 that is supported by the motor shaft 16 and is fluidly connected to the pump body 14, and a motor-side output adjusting member 25 that can vary the capacity of the motor body 18.

As shown in FIG. 1, in the present embodiment, a speed-increasing gear train 214 is interposed between the driving source 210 and the pump shaft 12, and the rotational power of the driving source 210 is operatively input via the speed-increasing gear train 214 to a first end portion of the pump shaft 12 on one end side in the axial line direction.

Instead, it is also possible to directly connect the driving source 210 to the pump shaft 12.

The pump body 14 is a variable-capacity axial piston machine having a pump-side cylinder block (not shown) supported by the pump shaft 12 in a relatively non-rotatable manner around the axial line with respect thereto, and pump-side pistons (not shown) housed in the pump-side cylinder block in a relatively non-rotatable manner around the axial line and in a slidable manner in the axial line direction with respect thereto; the pump body 14 is configured so that the capacity is changed according to an advance and retreat range of the pump-side piston. Piston pump systems can take various forms, including swash plate, swash shaft, and radial types.

The pump-side output adjusting member 20 is configured so as to continuously vary the capacity of the pump body 14 between a first pump capacity and a second pump capacity, and is configured so as to be operatively controlled by a control device 100 provided in the transmission structure 1.

Figure 2:
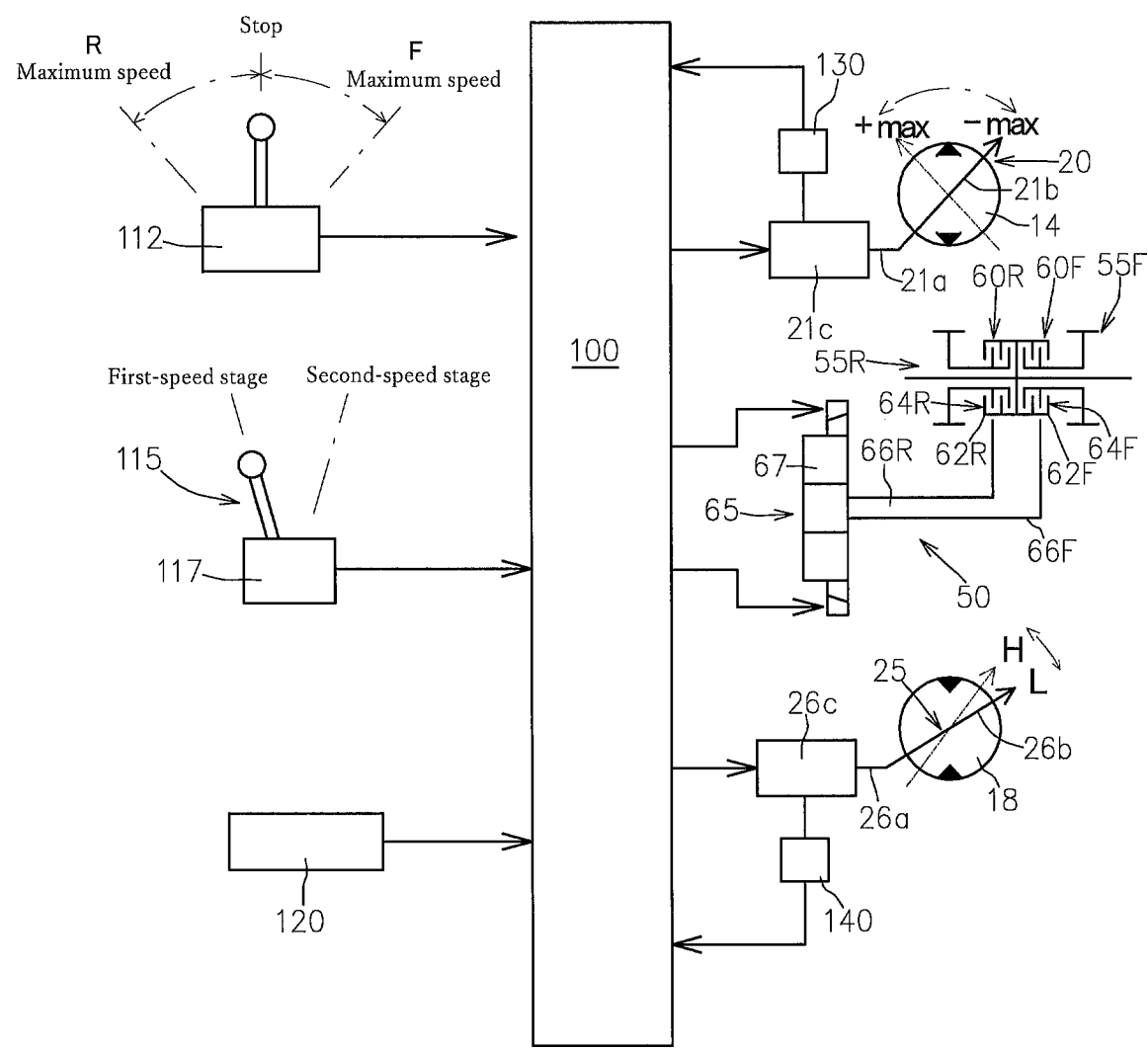
FIG. 2 is a control block diagram of a control device in the transmission structure according to the first embodiment.

FIG. 2 shows a control block diagram of the control device 100.

As shown in FIG. 2, the pump-side output adjusting member 20 has a pump-side control shaft 21a disposed on a pump-side swing axis orthogonal to the pump shaft 12, a pump-side movable swash plate 21b that is operatively connected to the pump-side control shaft 21a in such a manner as to be directly or indirectly engaged to a free end of the pump-side piston and swing around the pump-side swing axial line in accordance with the rotation of the pump-side control shaft 21a around the axial line so that the advance and retreat range of the pump-side piston is defined in accordance with a swing position of the pump-side movable swash plate 21b around the pump-side swing axial line, and a pump-side actuator 21c that rotates the pump-side control shaft 21a around the axial line.

As long as being operatively controllable by the control device 100, the pump-side actuator 21c can take various forms, such as an electro-hydraulic actuator including a solenoid valve and a hydraulic cylinder, or an electric actuator including an electric motor.

The first pump capacity is, for example, a pump capacity that is obtained when the pump-side movable swash plate 21b is swung around the pump-side swing axial line to a swing end of one of the forward and reverse rotation sides (for example, the reverse rotation side) that rotates the motor shaft 16 in the forward and reverse rotation directions, respectively, relative to the rotation direction of the pump shaft 12; and the second pump capacity is the pump capacity that is obtained when the pump-side movable swash plate 21b is swung to a swing end of the other one of the forward and reverse rotation sides (for example, the forward rotation side).

In this case, when the pump-side movable swash plate 21b is positioned in a neutral position around the pump-side swing axis, the pump body 14 has a neutral capacity (zero capacity) so that rotation of the motor shaft 16 becomes zero, regardless of whether the pump shaft 12 is rotating or not.

In the present embodiment, the pump capacity (reverse rotation side maximum capacity) that is obtained when the pump-side movable swash plate 21b is positioned at the swing end on the reverse rotation side is defined as the first pump capacity, and the pump capacity (forward rotation side maximum capacity) that is obtained when the pump-side movable swash plate 21b is positioned at the swing end on the forward rotation side is defined as a second pump capacity.

The motor body 18 is a variable-capacity axial piston machine having a motor-side cylinder block (not shown)

supported by the motor shaft 16 in a relatively non-rotatable manner around the axial line with respect thereto, and motor-side pistons (not shown) housed in the motor-side cylinder block in a relatively non-rotatable manner around the axial line and in a slidable manner in the axial line direction with respect thereto; and the motor body 18 is configured so that the capacity is changed according to the advance and retreat range of the motor-side pistons. Piston motor systems can take various forms, including swash plate, swash shaft, and radial types.

The motor-side output adjusting member 25 is configured so as to be able to change the capacity of the motor body 18 between a predetermined low-speed motor capacity (L) and a predetermined high-speed motor capacity (H) that is smaller than the low-speed motor capacity.

As shown in FIG. 2, the motor-side output adjusting member 25 has a motor-side control shaft 26a disposed on a motor-side swing axis orthogonal to the motor shaft 16, a motor-side movable swash plate 26b that is operatively connected to the motor-side control shaft 26a in such a manner as to swing around the motor-side swing axis in accordance with the rotation of the motor-side control shaft 26a around the axial line in a state of being directly or indirectly engaged to free ends of the motor-side piston, and a motor-side actuator 26c that rotates the motor-side control shaft 26a around the axial line.

As long as being operatively controllable by the control device 100, the motor-side actuator 26c can take various forms, such as an electro-hydraulic actuator including a solenoid valve and a hydraulic cylinder, or an electric actuator including an electric motor.

As the capacity of the motor body 18 becomes smaller, the rotation speed of the motor shaft 16 relative to the rotation speed of the pump shaft 12 increases.

Therefore, as the motor body 18 is changed in capacity from the low-speed motor capacity (large capacity) to the high-speed motor capacity (small capacity), the rotation speed of the motor shaft 16 increases.

As shown in FIG. 1, a second end portion of the pump shaft 12 on the other end side in the axial line direction is operatively connected to a PTO shaft 280 provided in the work vehicle 200.

In detail, as shown in FIG. 1, the work vehicle 200 has the PTO shaft 280, and a PTO transmission structure that forms a PTO system power-transmitting path from the pump shaft 12 to the PTO shaft 280.

In the present embodiment, the PTO transmission structure has a PTO drive shaft 260 connected to the second end portion of the pump shaft 12 on the other end side in the axial line direction in a relatively non-rotatable manner around the axial line with respect thereto, a first PTO transmission shaft 261 operatively connected to the PTO drive shaft 260 via a speed-reducing gear train 217, a second PTO transmission shaft 262, a PTO clutch mechanism 265 that engages and disengages the power transmission from the first PTO shaft 261 to the second PTO shaft 262, and a PTO speed-change mechanism 270 capable of changing, in multiple speed-change stages, the rotational power of the second PTO transmission shaft 262 and then transmitting the rotational power to the PTO shaft 280.

As shown in FIG. 1, the planetary gear mechanism 30 has a sun gear 32, a planetary gear 34 that meshes with the sun gear 32, an internal gear 36 that meshes with the planetary gear 34, and a carrier 38 that supports the planetary gear 34 in a rotatable manner around an axial line and rotates around the axial line of the sun gear 32 in conjunction with a revolution of the planetary gear 34 around the sun gear 32; and the sun gear 32, the carrier 38, and the internal gear 36 form three planetary elements.

The planetary gear mechanism 30 is configured so that, a reference rotation power from the driving source 210 is operatively input to a first element of the three planetary elements, the HST output from the motor shaft 16 is operatively input to a second element, and a combined rotational power, that is, an HMT output, which is made by combining the reference rotational power and the HST output is output from a third element, and to increase the speed of the HMT output as the HST output is changed in accordance with the change of the capacity of the pump body 14 from the first pump capacity to the second pump capacity.

As shown in FIG. 1, in the present embodiment, the internal gear 36 acts as the first element, the sun gear 32 acts as the second element, and the carrier 38 acts as the third element.

In detail, the sun gear 32 acting as the second element is supported on a sun gear shaft 32a in a relatively non-rotatable manner with respect thereto, and the sun gear shaft 32a is operatively connected to the motor shaft 16 via a gear train 215.

A cylindrical transmission shaft 36a is externally supported around the sun gear shaft 32a in a relatively rotatable manner with respect thereto.

The transmission shaft 36a is operatively connected to the PTO drive shaft 260 via a gear train 216.

The internal gear 36 acting as the first element is operatively connected to the transmission shaft 36a, and receives the rotary power from the driving source 210 via the pump shaft 12, the PTO drive shaft 260, the gear train 216, and the transmission shaft 36a.

A cylindrical planetary output shaft 39 is externally supported around the transmission shaft 36a in a relatively rotatable manner with respect thereto at a position different from the position where the transmission shaft 36a is externally supported. The carrier 38 acting as the third element is connected to the planetary output shaft 39.

As shown in FIG. 2, the transmission structure 1 further includes a manually operable speed-change operating member 110, a vehicle traveling speed sensor 120 that directly or indirectly detects the vehicle traveling speed of the work vehicle 200, a pump sensor 130 that directly or indirectly detects the capacity of the pump body 14, and a motor sensor 140 that directly or indirectly detects the capacity of the motor body 18.

A reference numeral 112 in FIG. 2 is a sensor that detects the operation state (operation position) of the speed-change operating member 110.

As long as the control device 100 can recognize the vehicle traveling speed, the vehicle traveling speed sensor 120 can be configured so as to detect the rotational speed of any rotating member in the power-transmitting path from the third element of the planetary gear mechanism 30 to the driving wheel 220.

As long as the control device 100 can recognize the capacities of the pump body 14 and the motor body 18, respectively, the pump sensor 130 and the motor sensor 140 can be configured in various ways.

The pump sensor 130 can be, for example, a sensor that detects the operating state of the pump-side actuator 21c or a sensor such as a potentiometer that detects a rotational angle around an axial line of the pump-side control shaft 21a.

Similarly, the motor sensor 140 can be, for example, a sensor that detects the operating state of the motor-side actuator 26c or a sensor such as a potentiometer that detects a rotational angle around an axial line of the motor-side control shaft 26a.

As shown in FIG. 1, the above transmission structure 1 includes a forward/rearward switching mechanism 50 capable of switching the rotational direction of the HMT output in the forward/rearward direction.

That is, the HST 10 and the planetary gear mechanism 30 in the transmission structure 1 are so set that the rotational direction of the HMT output is only one side around the axial line.

Then, the forward/rearward switching mechanism 50 is configured so as to selectively take a forward transmission state of outputting the HMT output as the rotational power for a vehicle forward movement and a rearward transmission state of outputting the HMT output as the rotational power for a vehicle rearward movement.

In detail, as shown in FIG. 1, the transmission structure 1 has a travel transmission shaft 45 on a downstream side of the planetary gear mechanism 30 in the transmission direction.

The forward/rearward switching mechanism 50 includes a forward transmission mechanism 55F that can operatively transmit, to the travel transmission shaft 45, the combined rotational power, which is output from the third element, as the rotational power for the vehicle forward movement, a rearward transmission mechanism 55R that can operatively transmit, to the travel transmission shaft 45, the combined rotational power as the rotational power for the vehicle rearward movement, a forward clutch mechanism 60F that engages and disengages the power transmission of the forward transmission mechanism 55F, a rearward clutch mechanism 60R that engages and disengages the power transmission of the rearward transmission mechanism 55R, and a forward/rearward switching actuator 65 that operates the forward clutch mechanism 60F and the rearward clutch mechanism 60R.

The forward transmission mechanism 55F has a forward driving gear 56F that is supported by the planetary output shaft 39 in a relatively non-rotatable manner with respect thereto, and a forward driven gear 57F that is, in a state of being meshed with the forward driving gear 56F, supported by the travel transmission shaft 45 in a relatively rotatable manner with respect thereto.

The rearward transmission mechanism 55R has a rearward driving gear 56R supported by the planetary output shaft 39 in a relatively non-rotatable manner with respect thereto, a rearward driven gear 57R that is supported by the travel transmission shaft 45 in a relatively rotatable manner with respect thereto, and a reverse gear train 58R that reverses the rotational force of the rearward driving gear 56R and then transmits the rotational force to the rearward driven gear 57R.

In the present embodiment, the reverse gear train 58R has a cylindrical intermediate shaft 58a that is externally fitted around the PTO drive shaft 260 in a relatively rotatable manner with respect thereto, a first intermediate gear 58b that is, in a state of being meshed with the rearward driving gear 56R, supported by the intermediate shaft 58a in a relatively non-rotatable manner with respect thereto, and a second intermediate gear 58c that is, in a state of being meshed with the rearward driven gear 57R, supported by the intermediate shaft 58a in a relatively non-rotatable manner with respect thereto.

In the present embodiment, the forward clutch mechanism 60F and the rearward clutch mechanism 60R are each a friction plate type clutch mechanism.

In detail, as shown in FIG. 1, the forward clutch mechanism 60F has a forward clutch housing 62F supported by the travel transmission shaft 45 in a relatively non-rotatable manner with respect thereto; a forward friction plate group 64F including a forward driven-side friction plate supported by the forward clutch housing 62F in a relatively non-rotatable manner with respect thereto, and a forward driving-side friction plate that is, in a state of facing the forward driven-side friction plate, connected to the forward driven gear 57F in a relatively non-rotatable manner with respect thereto; and a forward piston (not shown) that causes the forward friction plate group 64F to be frictionally engaged.

The rearward clutch mechanism 60R has a rearward clutch housing 62R supported by the travel transmission shaft 45 in a relatively non-rotatable manner with respect thereto; a rearward friction plate group 64R including a rearward driven-side friction plate supported by the rearward clutch housing 62R in a relatively non-rotatable manner with respect thereto, and a rearward driving-side friction plate that is, in a state of facing the rearward driven-side friction plate, connected to the rearward driven gear 57R in a relatively non-rotatable manner with respect thereto; and a rearward piston (not shown) that causes the rearward friction plate group 64R to be frictionally engaged.

In the present embodiment, the forward clutch housing 62F and the rearward clutch housing 62R are formed by a single common housing.

The forward/rearward switching mechanism 50 is operatively controlled by the control device 100.

In the present embodiment, as shown in FIG. 2, the forward/rearward switching actuator 65 includes a forward line 66F and a rearward line 66R fluidly connected to an oil chamber of the forward clutch housing 62F and an oil chamber of the rearward clutch housing 62R, respectively, and a solenoid valve 67 that switches supplying and discharging of pressure oil to and from the forward line 66F and the rearward line 66R.

The solenoid valve 67 can take a forward position in which the pressure oil from the hydraulic source is supplied to the forward line 66F and the rearward line 66R is fluidly connected to the drain line, a rearward position in which the pressure oil from the hydraulic source is supplied to the rearward line 66R and the forward line 66F is fluidly connected to the drain line, and a power shutoff position in which the forward and rearward lines 66F and 66R are opened.

The solenoid valve 67 is operatively controlled by the control device 100 in accordance with the manual operation by the operator.

As shown in FIG. 2, in the present embodiment, the speed-change operating member 110 is of a manually operable lever type, and can be operated from the stop position (zero speed position) to the forward and rearward sides.

In this case, the control device 100 causes the solenoid valve 67 to be positioned at the forward and rearward positions, respectively, according to operations of the speed-change operating member 110 to the forward and rearward sides.

In the present embodiment, the forward/rearward switching actuator 65 is an electric-hydraulic actuator, but alternatively, the forward/rearward switching actuator 65 can be an electric actuator such as an electric motor.

As shown in FIGS. 1 and 2, the transmission structure 1 includes an auxiliary speed-change mechanism 70 that changes, in multiple speed-change stages, the combined rotational power of the planetary gear mechanism 30, which is operatively input, and outputs the speed-changed rotational power toward the driving wheel 220.

In the present embodiment, the auxiliary speed-change mechanism 70 is configured so as to make two speed-change stages: a first-speed stage which is a low-speed stage and a second-speed stager which is a high-speed stage.

In the present embodiment, the auxiliary speed-change mechanism 70 is configured so as to execute two speed-change stages between the travel transmission shaft 45 and the travel output shaft 47 that is disposed on a downstream side of the travel transmission shaft 45 in the transmission direction.

In detail, as shown in FIG. 1, the auxiliary speed-change mechanism 70 has a first-speed gear train 71(1) that can transmit the rotational power from the travel transmission shaft 45 to the travel output shaft 47 at a predetermined speed-change ratio, a second-speed gear train 71(2) that can transmit the rotary power from the travel transmission shaft 45 to the travel output shaft 47 at a speed-change ratio (speed-change ratio causing the travel output shaft 47 to rotate at high speed) higher than the predetermined speed-change ratio, a first-speed clutch mechanism 75(1) that engages and disengages the power transmission of the first-speed gear train 71(1), and a second-speed clutch mechanism 75(2) that engages and disengages the power transmission of the second-speed gear train 71(2).

In the present embodiment, the first-speed gear train 71(1) includes a first-speed driving gear 72(1) supported by the travel transmission shaft 45, and a first-speed driven gear 73(1) that is, in a state of being meshed with the first-speed driving gear 72(1), supported by the travel output shaft 47.

The second-speed gear train 71(2) includes a second-speed driving gear 72(2) that is supported by the travel transmission shaft 45 and that is larger in diameter than the first-speed driving gear 72(1), and a second-speed driven gear 73(2) that is, in a state of being meshed with the second-speed driving gear 72(2), supported by the travel output shaft 47 and that is smaller in diameter than the first-speed driven gear 73(1).

One of the driving-side gear group formed by the first-speed and second-speed driving gears 72(1) and 72(2), and the driven-side gear group formed by the first-speed and second-speed driven gears 73(1) and 73(2) is supported by the corresponding shaft in a relatively non-rotatable manner with respect thereto, and the other one is supported by the corresponding shaft in a relatively rotatable manner with respect thereto.

Based on the above, the first-speed and second-speed clutch mechanisms 75(1), 75(2) are configured so as to engage and disengage the gears that are supported by the corresponding shafts in a relatively rotatable manner with respect thereto.

In the present embodiment, as shown in FIG. 1, the driving-side gear group is supported by the corresponding travel transmission shaft 45 in a relatively rotatable manner with respect thereto; therefore, the first-speed clutch mechanism 75(1) is configured so as to selectively engage and disengage the first-speed driving gear 72(1) to and from the travel transmission shaft 45, and the second-speed clutch mechanism 75(2) is configured so as to selectively engage and disengage the second-speed driving gear 72(2) to and from the travel transmission shaft 45.

In the present embodiment, the first-speed clutch mechanism 75(1) and the second-speed clutch mechanism 75(2) each are of a dog clutch type.

In detail, the first-speed clutch mechanism 75(1) includes a first-speed slider supported on the corresponding shaft (in the present embodiment, the travel transmission shaft 45) in a relatively non-rotatable manner and in a movable manner in the axial line direction, and a first-speed concave-convex engagement portion that includes one of the concave and convex engagement portions provided on the opposing face of the first-speed driving gear 72(1), and the other of the concave and convex engagement portions provided on the opposing face of the first-speed slider.

The second-speed clutch mechanism 75(2) includes a second-speed stage slider supported by the corresponding shaft (in the present embodiment, the travel transmission shaft 45) in a relatively non-rotatable manner with respect thereto and in a movable manner in the axial line direction, and a second-speed concave-convex engagement portion that includes one of the concave and convex engagement portions provided on the opposing face of the second-speed driving gear 72(2) and the other of the concave and convex engagement portions provided on the opposing face of the second-speed stage slider.

In the present embodiment, the first-speed and second-speed stage sliders are formed by a single common slider.

In the present embodiment, as shown in FIG. 2, the auxiliary speed-change mechanism 70 is configured so as to be operatively controlled by the control device 100 in accordance with the operation of a manually operable lever-shaped auxiliary speed-change operating member 115.

That is, the auxiliary speed-change mechanism 70 includes an auxiliary speed-change switching actuator that is formed by an electro-hydraulic actuator or an electric actuator and that actuates the first-speed slider and the second-speed stage slider (the common slider in the present embodiment).

Then, the control device 100 executes the operation control of the auxiliary speed-change switching actuator based on the signal from a sensor 117 that detects the operation state (operation position) of the auxiliary speed-change operating member 115.

Alternatively, the auxiliary speed-change switching actuator can also be configured so as to be actuated via a mechanical link in accordance with the manual operation of the auxiliary speed-change operating member 115.

The mechanical link is configured so as to actuate the first-speed slider and the second-speed stage slider (the common slider in the present embodiment) using mechanical movement of the auxiliary speed-change operating member 115 by the manual operation.

In this case as well, it is also possible to so configure that the control device 100 can recognize, by the sensor 117, the operation state (operation position) of the auxiliary speed-change operating member 115.

In the present embodiment, the work vehicle 200 has a pair of main driving wheels that act as the driving wheels 220, a pair of main driving axles 250 that drive the pair of main driving wheels respectively, and a differential gear mechanism 300; and the rotational power of the travel output shaft 47 is differentially transmitted to the pair of main driving axles 250 via the differential gear mechanism 300.

A reference numeral 255 in FIG. 1 is a travel brake mechanism that selectively applies a braking force to the main driving axle 250, and a reference numeral 310 is a differential lock mechanism that forcibly drives the pair of main driving axles 250 in a synchronized to each other by the rotational power from the travel output shaft 47.

A control structure by the above control device 100 will be described below.

Figure 3A:
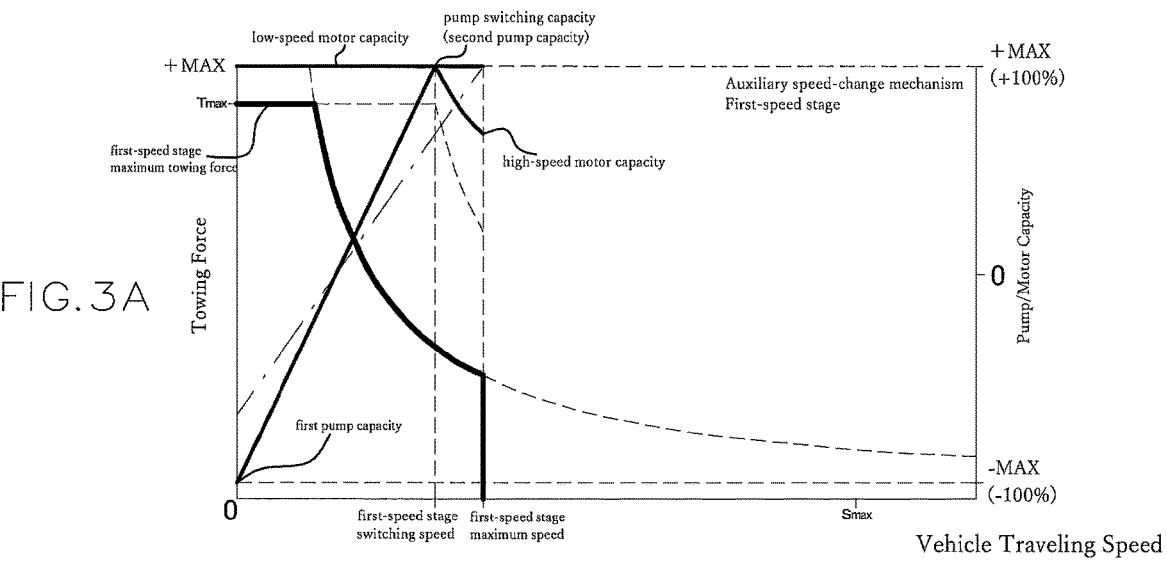
FIGS. 3A and 3B are graphs showing relation between vehicle traveling speed and towing force with respect to an HST capacity (capacities of a pump body and a motor body) in the work vehicle to which the transmission structure according to the first embodiment is applied, and are graphs when an auxiliary speed-change mechanism provided in the transmission structure is engaged with a first-speed stage (a low-speed stage) and a second-speed stage (a high-speed stage), respectively.
Figure 3B:
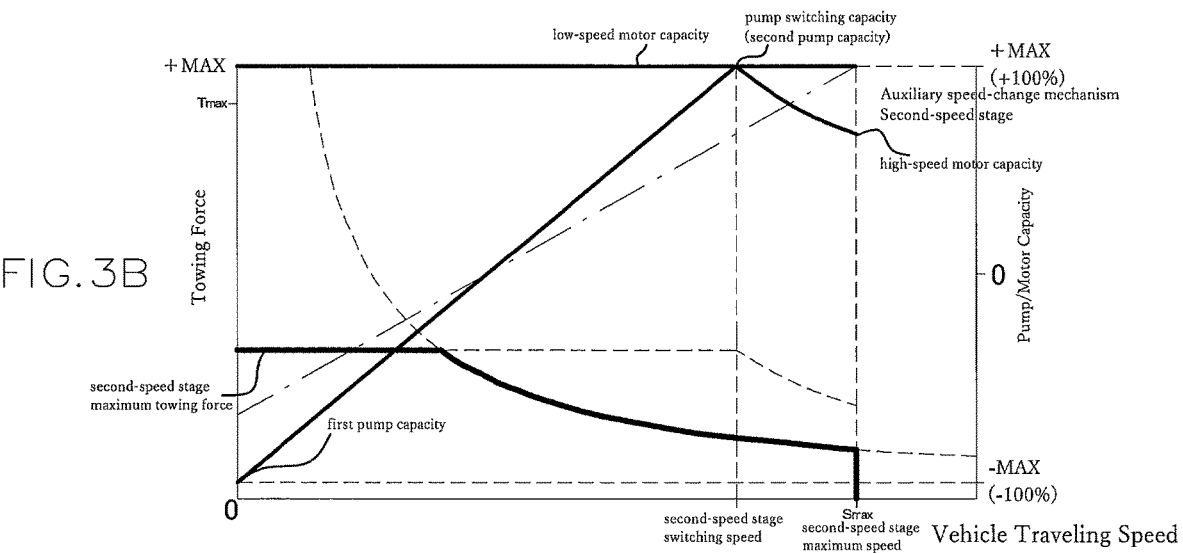

FIGS. 3A and 3B show the relation between the vehicle traveling speed and the towing force with respect to the HST capacity (capacities of the pump body 14 and the motor body 18) with the auxiliary speed-change mechanism 70 engaged with the first-speed stage and the second-speed stage, respectively.

As shown in FIGS. 3A and 3B, when the vehicle traveling speed detected by the vehicle traveling speed sensor 120 is equal to or lower than the switching speed that is realized by the motor body 18 being set to the low-speed motor capacity and the pump body 14 being set to the predetermined pump switching capacity, the control device 100 executes a normal control mode in which the pump-side output adjusting member 20 is operated so that the vehicle traveling speed increases and reduces in accordance with the speed-increasing and speed-reducing operations of the speed-change operating member 110 while the motor-side output adjusting member 25 being operated so that the motor body 18 is fixed at the low-speed motor capacity.

And, when the vehicle traveling speed is higher than the switching speed, the control device 100 executes a high-speed control mode in which the motor-side output adjusting member 25 is operated so that the vehicle traveling speed increases and reduces in accordance with the speed-increasing and speed-reducing operations of the speed-change operating member 110 while the pump-side output adjusting member 20 being operated so that the pump body 14 is fixed at the pump switching capacity.

According to the above configuration, while preventing changes in vehicle traveling speed at the time of the switching between the normal operation control mode and a high-speed operation control mode, the speed-changeable range of the output of the HMT formed by the HST 10 and the planetary gear mechanism 30 can be expanded.

Figure 15:
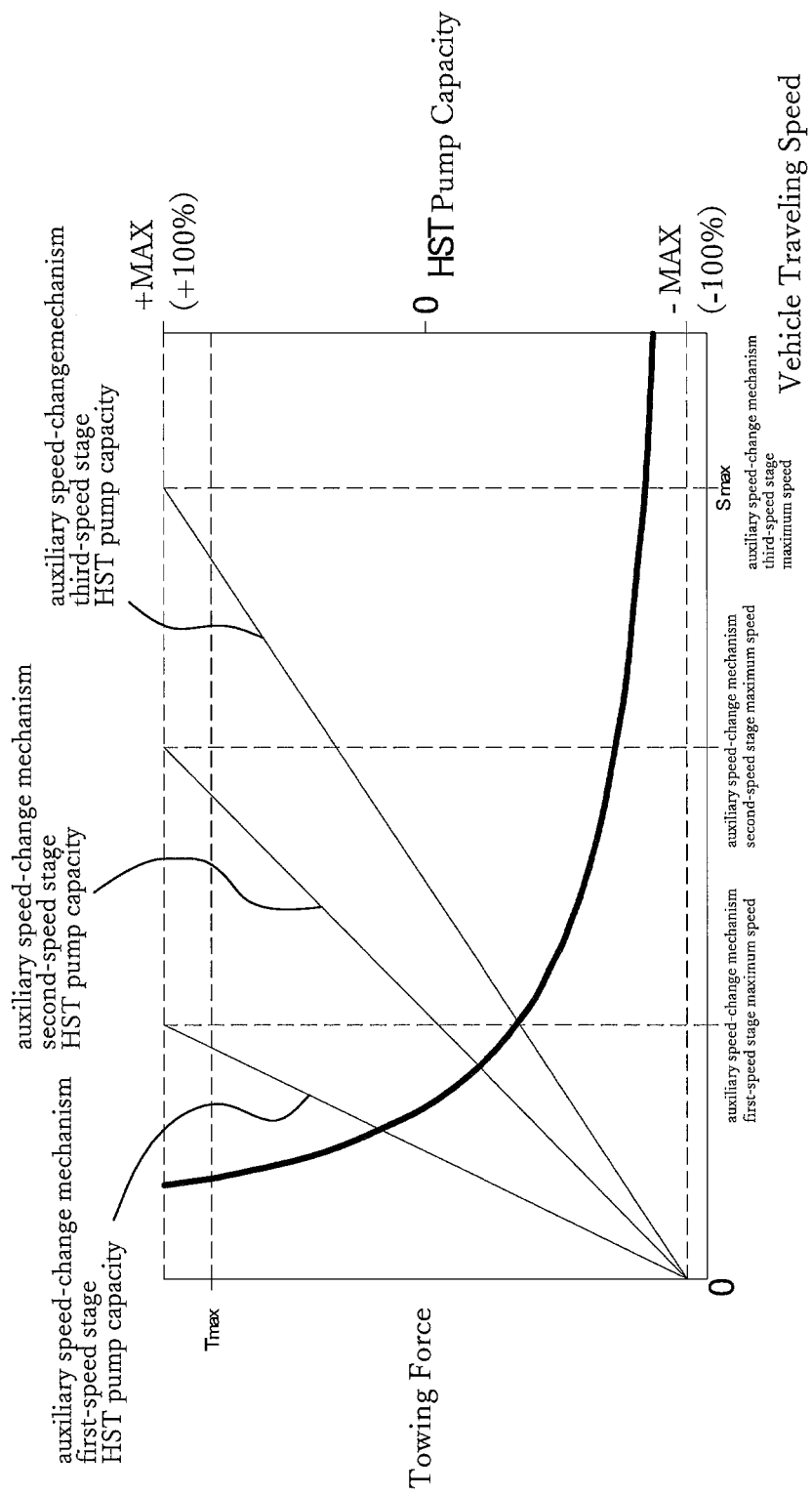
FIG. 15 is a graph showing a relation between required maximum towing force and required maximum vehicle traveling speed with respect to HST capacity (HST pump capacity) in one example of a work vehicle to which the conventional transmission structure shown in FIG. 14 is applied.
Figure 16A:
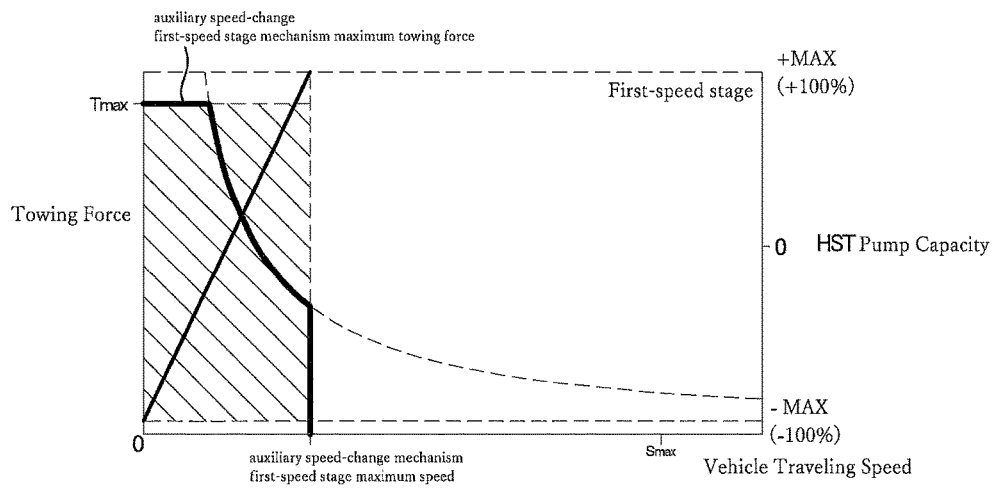
FIGS. 16A to 16C are graphs showing a relation between vehicle traveling speed and towing force, which can be realized, with respect to HST capacity (HST pump capacity) in the work vehicle to which the conventional transmission structure is applied, and show states where an auxiliary speed-change mechanism provided in the work vehicle is engaged with low-speed stage, intermediate-speed stage and high-speed stage, respectively.
Figure 16B:
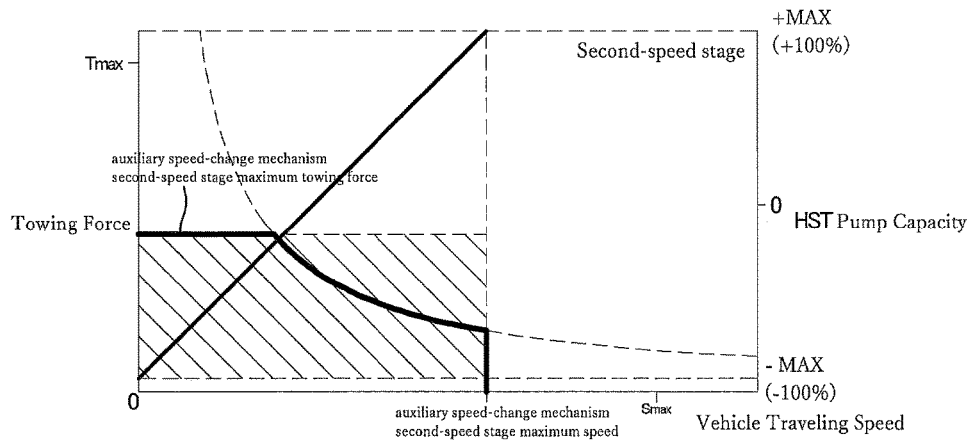
Figure 16C:
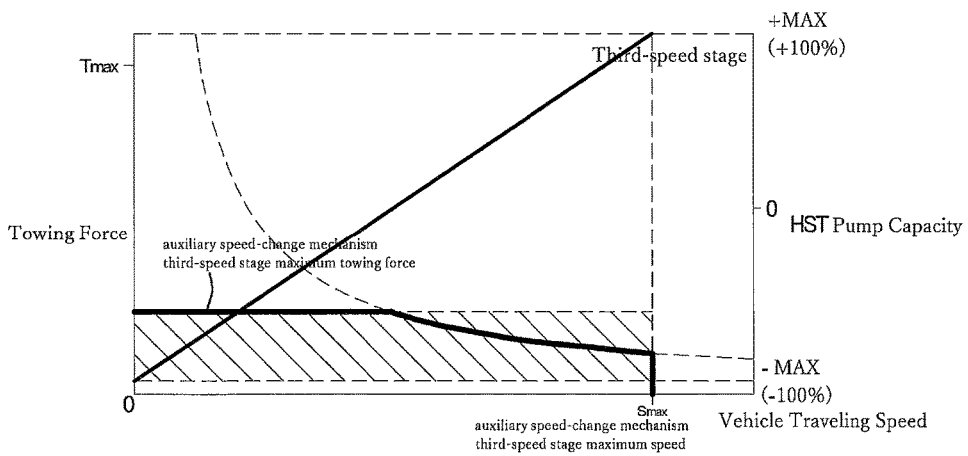

Therefore, the range of the required maximum towing force Tmax and the required maximum vehicle traveling speed Smax, which could not be covered, in the conventional transmission structure (see FIGS. 14 to 16), without providing the auxiliary speed-change mechanism 570 having three speed-change stages, can be covered only by providing the auxiliary speed-change mechanism 70 having only two speed-change stages, thereby making the transmission structure of the work vehicle 200 compact and inexpensive.

In the present embodiment, the vehicle traveling speed sensor 120 is configured so as to detect the speed of the rotational power in the state after being subjected to the multiple-speed changing by the auxiliary speed-change mechanism 70 (that is, the travel output shaft 47, or the rotational member such as the main driving axle 250 on the downstream side of the travel output shaft 47 in the transmission direction); therefore, the control device 100 has, as the switching speed, a first-speed switching speed (FIG. 3A) and a second-speed switching speed (FIG. 3B) which are used in a first-speed transmission state and a second-speed transmission state of the auxiliary speed-change mechanism 70, respectively.

Alternatively, in a case where the vehicle traveling speed sensor 120 is configured so as to detect the rotational speed of the rotational power (for example, the rotational power of the third element 38, the planetary output shaft 39, or the travel transmission shaft 45) in the state before being subjected to the multiple-speed changing by the auxiliary speed-change mechanism 70, the control device 100 is configured so as to execute an operation control using a single switching speed, regardless of the speed-change engagement state of the auxiliary speed-change mechanism 70.

As shown in FIGS. 3A and 3B, in the present embodiment, setting the second pump capacity to the above pump switching capacity expands the speed-change range of the combined rotational power of the planetary gear mechanism 30 that can be changed in accordance with the capacity change of the pump body 14. However, the present invention is not limited to such a configuration, and it is possible to set, as the pump switching capacity, any pump capacity such as 90% of the second pump capacity.

As shown in FIGS. 3A and 3B, in the present embodiment, the planetary gear mechanism 30 is so set that when the pump body 14 is set to the first pump capacity, the HMT output becomes zero speed (vehicle traveling speed zero), thereby expanding the speed range of the HMT output that can be speed-changed by the capacity change of the pump body 14. However, the present invention is not limited to such a configuration. It is also possible to set the planetary gear mechanism 30 so that the HMT output becomes zero speed at an any predetermined pump capacity, such as 90% of the first pump capacity.

Figure 4:
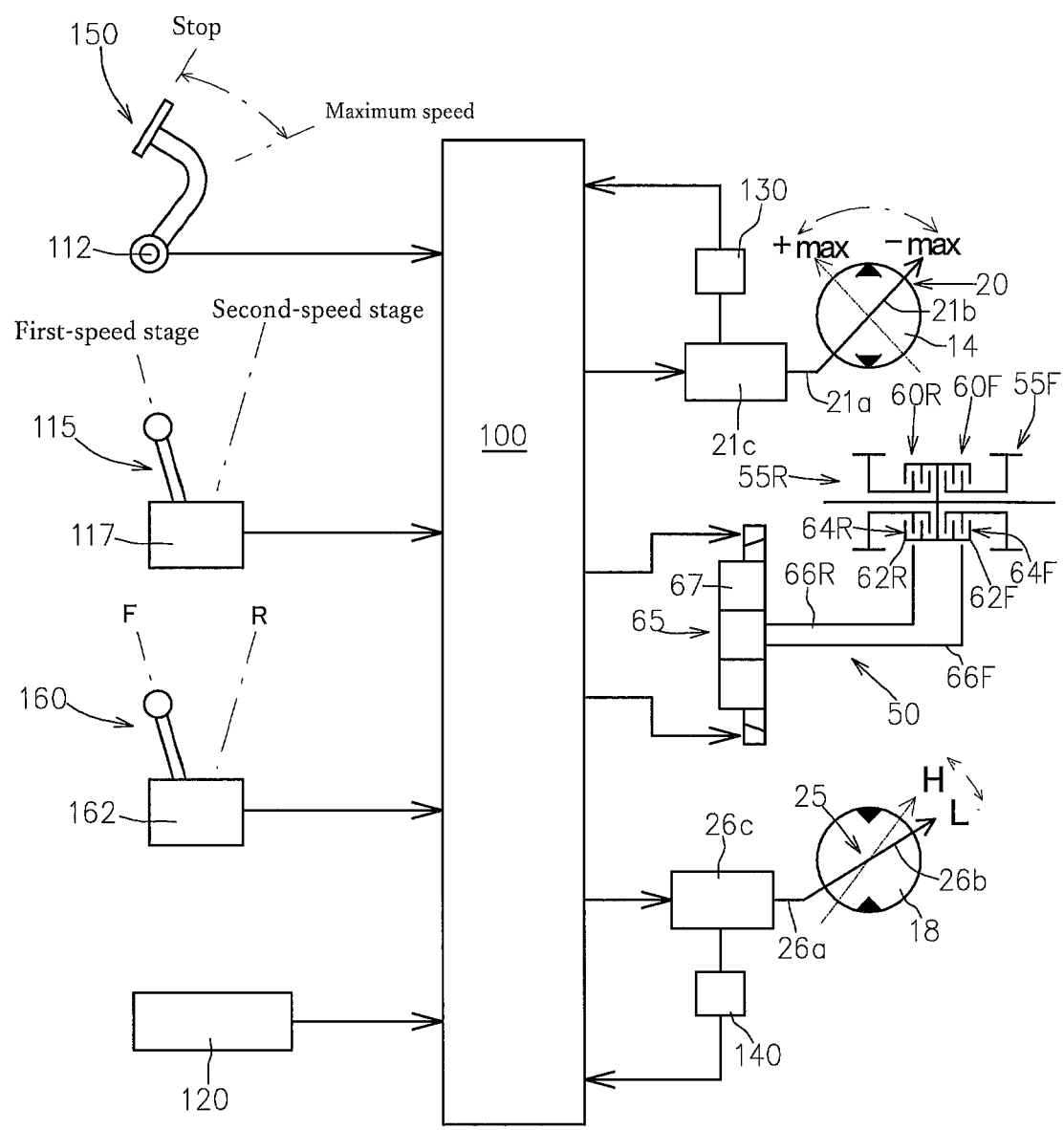
FIG. 4 is a control block diagram of a control device in a modification of FIG. 2.

As shown in FIG. 2, in the present embodiment, the speed-change operating member 110 can be operated from the stop position (zero speed position) to the forward and rearward sides. However, as shown in FIG. 4, it is also possible to use, instead of the speed-change operating member 110, a foot-operated pedal-type speed-change operating member 150 that can be operated only in one direction from the stop position (zero speed position).

In this case, an independent manually operable lever-type forward/rearward switch operating member 160 which is separate from the speed-change operating member 150 is provided, and the control device 100 is configured so as to execute a control operation of the forward/rearward switching mechanism 70 based on a signal from a sensor 162 that detects an operation state (operation position) of the forward/rearward switch operating member 160.

Second Embodiment

Another embodiment of the transmission structure will be described below with reference to the accompanying drawings.

Figure 5A:
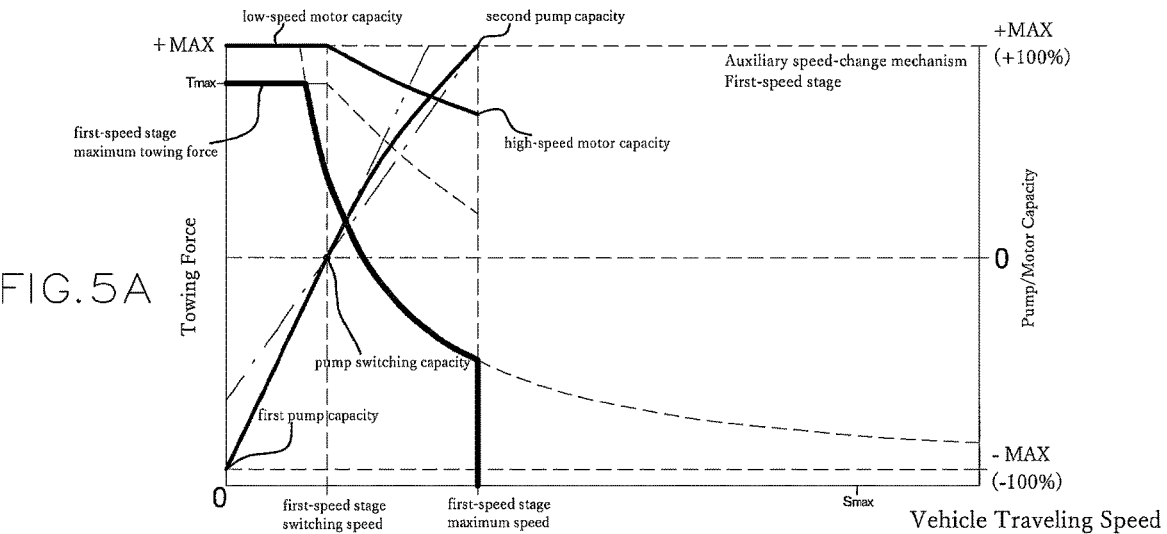
FIGS. 5A and 5B are graphs showing relation between vehicle traveling speed and towing force with respect to the HST capacity (capacities of the pump body and the motor body) in a work vehicle to which a transmission structure according to a second embodiment of the present invention is applied, and are graphs when the auxiliary speed-change mechanism provided in the transmission structure is engaged with the first-speed stage (the low-speed stage) and the second-speed stage (the high-speed stage), respectively.
Figure 5B:
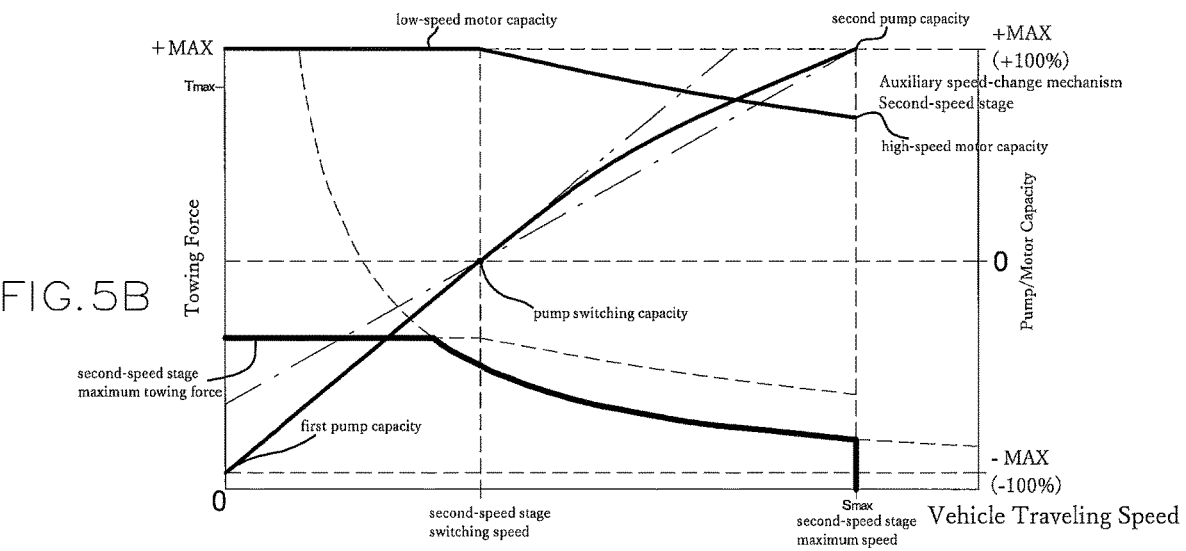

FIGS. 5A and 5B show the relation between the vehicle traveling speed and the towing force with respect to the HST capacity (capacities of the pump body 14 and the motor body 18) in the state where the auxiliary speed-change mechanism 70 is engaged with the first-speed stage and the second-speed stage, respectively, in the transmission structure according to the present embodiment.

The transmission schematic diagram of the work vehicle to which the transmission structure according to the present embodiment is applied will be the same as that in FIG. 1, and a control block diagram will be the same as that in FIG. 2.

The transmission structure according to the present embodiment differs from the transmission structure according to the first embodiment only in the control structure executed by the control device 100.

Only differences will be described below.

In the transmission structure 1 according to the first embodiment, the control device 100,
when the vehicle traveling speed is equal to or lower than the switching speed that is realized by the motor body 18 being set to the low-speed motor capacity and the pump body 14 being set to the pump switching capacity, changes the capacity of the pump body 14 from the side of the first pump capacity to the side of the pump switching capacity in accordance with the speed-increasing operation of the speed-change operating member 110 and changes the capacity of the pump body 14 from the side of the pump switching capacity to the side of the first pump capacity in accordance with the speed-reducing operation of the speed-change operating member 110 while having the motor body 18 fixed at the low-speed motor capacity, and when the vehicle traveling speed is higher than the switching speed, changes the capacity of the motor body 18 from the side of the low-speed motor capacity to the side of the high-speed motor capacity in accordance with the speed-increasing operation of the speed-change operating member 110 and changes the capacity of the motor body 18 from the side of the high-speed motor capacity to the side of the low-speed motor capacity in accordance with the speed-reducing operation of the speed-change operating member 110 while having the pump body 14 fixed at the pump switching capacity.

Contrary to the above, in the transmission structure according to the present embodiment, as shown in FIGS. 5A and 5B, the control device 100 is configured so as to execute the normal control mode when the vehicle traveling speed is equal to or lower than the switching speed that is realized by the motor body 18 being set to the low-speed motor capacity and the pump body 14 being set to the predetermined pump switching capacity between the first and second pump capacities, the normal control mode causing the pump-side output adjusting member 20 to be operated so that the vehicle traveling speed increases and reduces in accordance with the speed-increasing and speed-reducing operations of the speed-change operating member 110 while causing the motor-side output adjusting member 25 to be operated so that the motor body 18 is fixed at the low-speed motor capacity, and execute the high-speed control mode when the vehicle traveling speed is higher than the switching speed, the high-speed control mode causing the pump-side output adjusting member 20 and the motor-side output adjusting member 25 to synchronously perform the respective speed-increasing operations in accordance with the speed-increasing operation of the speed-change operating member 110, and also causing the pump-side output adjusting member 20 and the motor-side output adjusting member 25 to synchronously perform the respective speed-reducing operations in accordance with the speed-reducing operation of the speed-change operating member 110, the speed-increasing operations of the pump-side output adjusting member 20 and the motor-side output adjusting member 25 changing the capacity of the pump body 14 from the side of the pump switching capacity to the side of the second pump capacity and changing the capacity of the motor body 18 from the side of the low-speed motor capacity to the side of the high-speed motor capacity, respectively, the speed-reducing operations of the pump-side output adjusting member 20 and the motor-side output adjusting member 25 changing the capacity of the pump body 14 from the side of the second pump capacity to the side of the pump switching capacity and changing the capacity of the motor body 18 from the side of the high-speed motor capacity to the side of the low-speed motor capacity, respectively.

The present embodiment having the above configuration can obtain same effect as in the first embodiment.

As shown in FIGS. 5A and 5B, in the present embodiment, the pump switching capacity is set to the neutral capacity (zero capacity) that makes the rotation of the motor shaft 16 zero regardless of the rotation state of the pump shaft 12.

This configuration allows smooth switching between the normal control mode and the high-speed control mode.

Further, the pump switching capacity can be set to any desired capacity other than the neutral capacity (zero capacity).

Figure 6A:
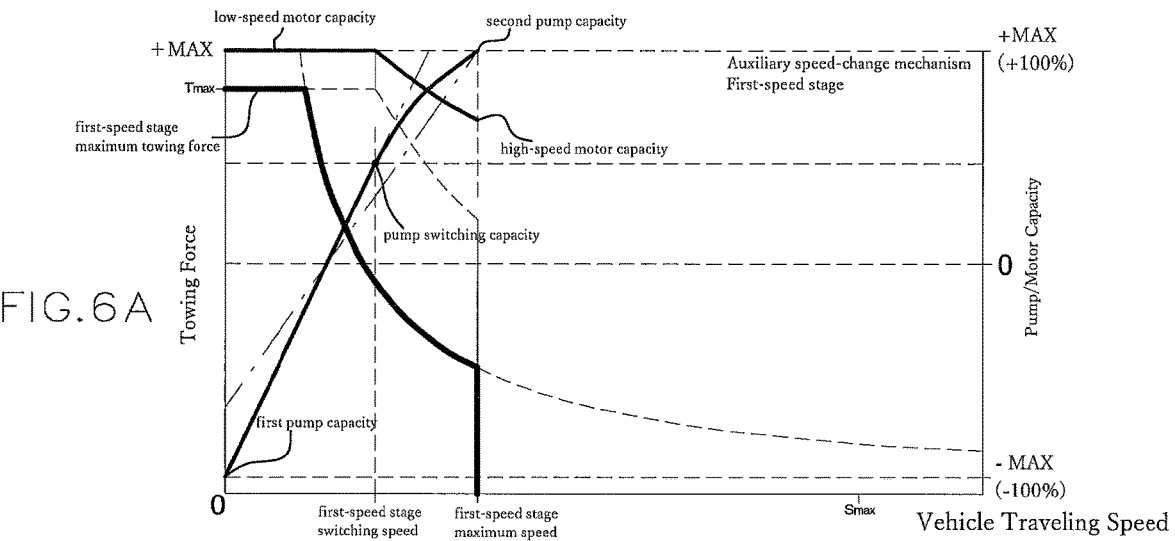
FIGS. 6A and 6B are graphs showing relation between vehicle traveling speed and towing force with respect to the HST capacity (capacities of the pump body and the motor body) in a work vehicle to which a transmission structure according to modification of the second embodiment is applied, and are graphs when the auxiliary speed-change mechanism provided in the transmission structure is engaged with the first-speed stage (the low-speed stage) and the second-speed stage (the high-speed stage), respectively.
Figure 6B:
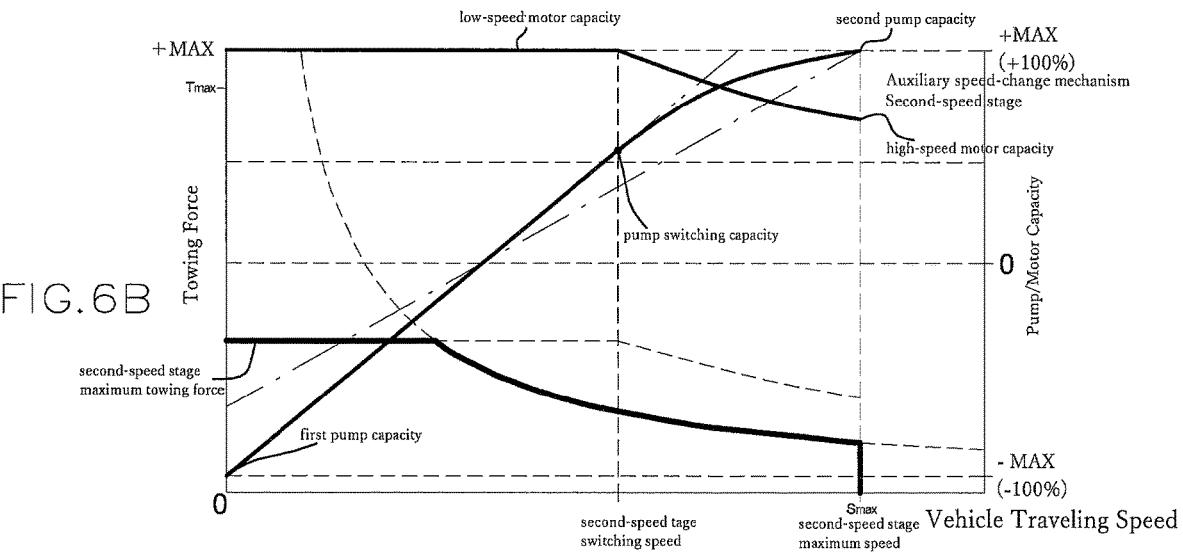

For example, in a case where the first pump capacity is set to the reverse rotation side maximum capacity (−100%) and the second pump capacity is set to the forward rotation side maximum capacity (+100%), the pump switching capacity can be set to a forward rotation side intermediate capacity (for example, +50%) between the neutral capacity and the second pump capacity, as shown in FIGS. 6A and 6B.

Third Embodiment

A still other embodiment of the transmission structure according to the present invention will be described below with reference to the accompanying drawings.

Figure 7A:
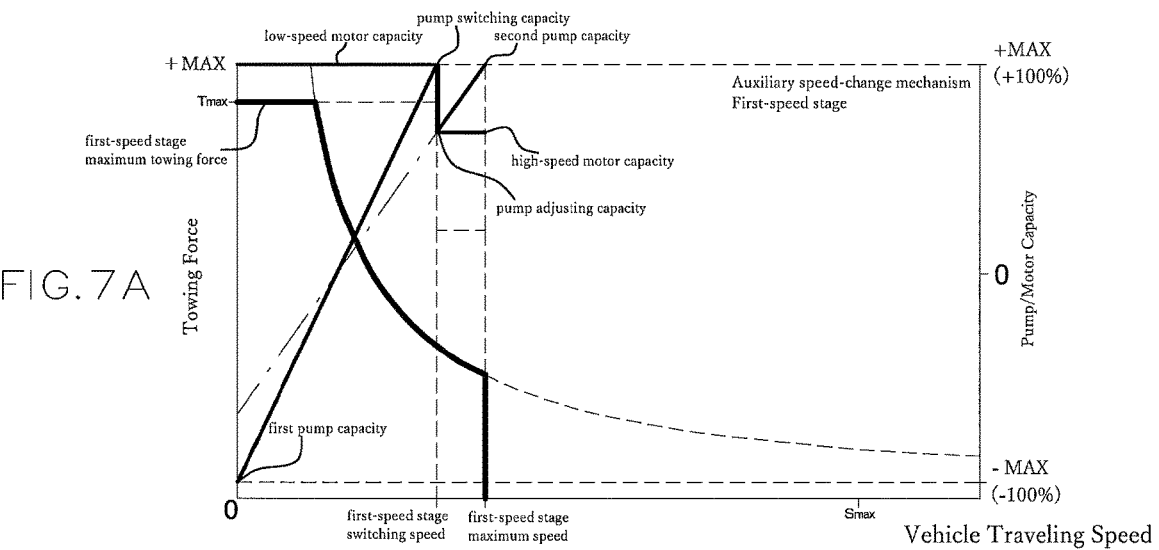
FIGS. 7A and 7B are graphs showing relation between vehicle traveling speed and towing force with respect to the HST capacity (capacities of the pump body and the motor body) in a work vehicle to which a transmission structure according to a third embodiment of the present invention is applied, and are graphs when the auxiliary speed-change mechanism provided in the transmission structure is engaged with the first-speed stage (the low-speed stage) and the second-speed stage (the high-speed stage), respectively.
Figure 7B:
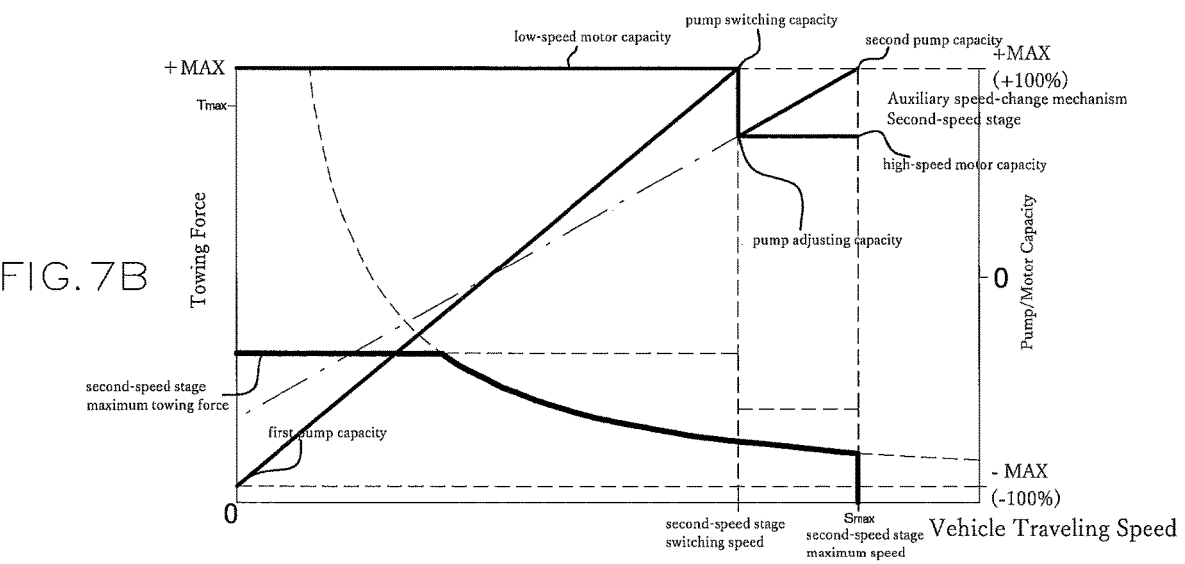

FIGS. 7A and 7B show the relation between the vehicle traveling speed and towing force with respect to the HST capacity (capacities of the pump body and the motor body) in the state where the auxiliary speed-change mechanism 70 is engaged with the first-speed stage and the second-speed stage, respectively, in the transmission structure according to the present embodiment.

The transmission schematic diagram of the work vehicle to which the transmission structure according to the present embodiment is applied will be the same as that in FIG. 1, and a control block diagram will be the same as that in FIG. 2.

The transmission structure according to the present embodiment differs from the transmission structures of the first and second embodiments only in the control structure executed by the control device 100.

That is, in the transmission structure according to the present embodiment, as shown in FIGS. 7A and 7B, the control device executes the normal control mode when the vehicle traveling speed is lower than the switching speed that is realized by the motor body 18 being set to the low-speed motor capacity and the pump body 14 being set to the predetermined pump switching capacity (the first-speed switching speed (FIG. 7A) in a case where the auxiliary speed-change mechanism 70 is engaged in the first-speed stage, and the second-speed switching speed (FIG. 7B) in a case where the auxiliary speed-change mechanism 70 is engaged in the second-speed stage), the normal control mode causing the pump-side output adjusting member 20 to be operated so as to change the capacity of the pump body 14 from the side of the first pump capacity to the side of the pump switching capacity to increase the vehicle traveling speed in accordance with the speed-increasing operation of the speed-change operating member 110 and also causing the pump-side output adjusting member 20 to be operated so as to change the capacity of the pump body 14 from the side of the pump switching capacity to the side of the first pump capacity to decrease the vehicle traveling speed in accordance with the speed-decreasing operation of the speed-change operating member 110 while causing the motor-side output adjusting member 25 to be operated so as to have the motor body 18 fixed at the low-speed motor capacity.

In the present embodiment, as shown in FIGS. 7A and 7B, setting the second pump capacity to the above pump switching capacity expands the speed-change range of the HMT output that can be changed in accordance with the capacity change of the pump body 14. However, the present invention is not limited to such a configuration, and it is possible to set, as the pump switching capacity, any pump capacity such as 90% of the second pump capacity.

The control device 100 executes a high-speed transition switching control mode when the vehicle traveling speed reaches the switching speed from the low-speed side, the high-speed transition switching control mode causing the motor-side output adjusting member 25 to be operated so that the capacity of the motor body 18 changes from the low-speed motor capacity to the high-speed motor capacity and causing, at the same time, the pump-side output adjusting member 20 to be operated so that the capacity of the pump body 14 becomes the pump adjusting capacity that can maintain the vehicle traveling speed at the switching speed in the state of the motor body 18 being set to the high-speed motor capacity.

Further, the control device 100 executes the high-speed control mode when the vehicle traveling speed is higher than the switching speed, the high-speed control mode causing the pump-side output adjusting member 20 to be operated so that the pump capacity is changed from the side of pump adjusting capacity to the side of the second pump capacity to increase the vehicle traveling speed in accordance with the speed-increasing operation of the speed-change operating member 110 and also causing the pump-side output adjusting member 20 to be operated so that the pump capacity is changed from the side of second pump capacity to the side of pump adjusting capacity to reduce the vehicle traveling speed in accordance with the speed-reducing operation of the speed-change operating member 110 while causing the motor-side output adjusting member 25 to be operated so that the motor body 18 is fixed at the high-speed motor capacity.

Then, the control device 100 executes a normal transition switching control mode when the vehicle traveling speed reaches the switching speed from the high-speed side, the normal transition switching control mode causing the motor-side output adjusting member 25 to be operated so that the capacity of the motor body 18 changes from the high-speed motor capacity to the low-speed motor capacity and causing, at the same time, the pump-side output adjusting member 20 to be operated so that the capacity of the pump body 14 changes from the pump adjusting capacity to the pump switching capacity.

The present embodiment having the above configuration can obtain the same effect as in the first and second embodiments.

Fourth Embodiment

An embodiment of a transmission structure according to the present invention will be described below with reference to the accompanying drawings.

FIG. 2 shows a transmission schematic diagram of a work vehicle 201 to which a transmission structure 4 according to the present embodiment is applied.

Figure 8:
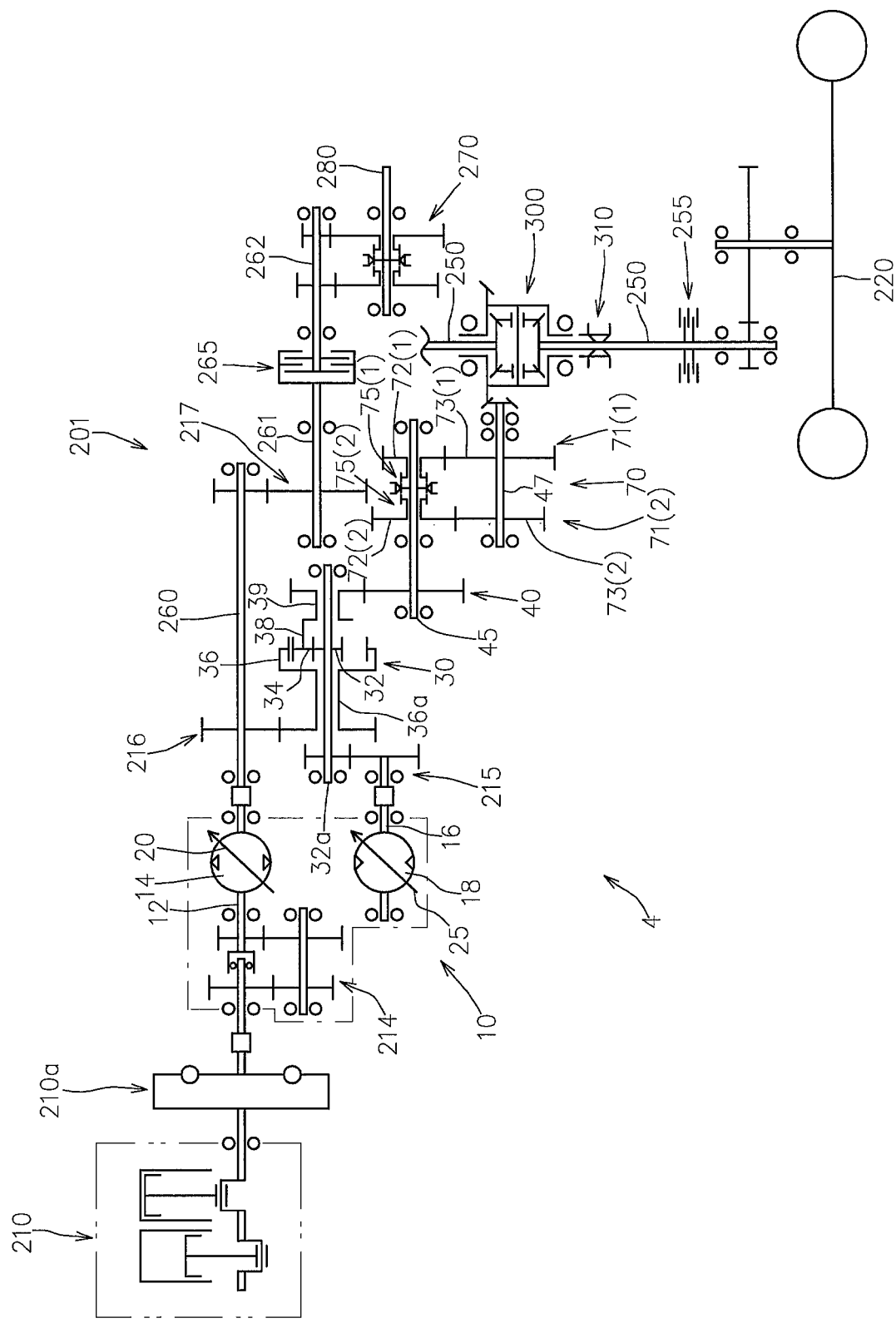
FIG. 8 is a transmission schematic diagram of a work vehicle to which a transmission structure according to a fourth embodiment of the present invention is applied.

As shown in FIG. 8, the work vehicle 201 has the driving source 210, the driving wheels 220, and the transmission structure 4 interposed in the traveling-system power-transmitting path from the driving source 210 to the driving wheels 220.

As shown in FIG. 8, the transmission structure 4 includes the Hydro-Static-Transmission (HST) 10, and the planetary gear mechanism 30 that cooperates with the HST 10 thereby to form the Hydro-Mechanical-Transmission (HMT).

The HST 10 has the pump shaft 12 that operatively inputs the rotational power from the driving source 210, the pump body 14 supported by the pump shaft 12, the pump-side output adjusting member 20 that can continuously vary the capacity of the pump body 14, the motor shaft 16, the motor body 18 that is supported by the motor shaft 16 and is fluidly connected to the pump body 14, and the motor-side output adjusting member 25 that can change the capacity of the motor body 18.

As shown in FIG. 8, in the present embodiment, the speed-increasing gear train 214, which has an input shaft and an output shaft arranged coaxially to each other, is interposed between the driving source 210 and the pump shaft 12, and the rotational power of the driving source 210 is operatively input via the speed-increasing gear train 214 to the first end portion of the pump shaft 12 on one end side in the axial line direction.

Instead, it is also possible to directly connect the driving source 210 to the pump shaft 12.

The pump body 14 is the variable-capacity axial piston machine having the pump-side cylinder block (not shown) supported by the pump shaft 12 in a relatively non-rotatable manner around the axial line with respect thereto, and the pump-side pistons (not shown) housed in the pump-side cylinder block in a relatively non-rotatable manner around the axial line and in a slidable manner in the axial line direction with respect thereto; the pump body 14 is configured so that the capacity is changed according to the advance and retreat range of the pump-side piston. Piston pump systems can take various forms, including swash plate, swash shaft, and radial types.

The pump-side output adjusting member 20 is configured so as to continuously vary the capacity of the pump body 14 between the first pump capacity and the second pump capacity with the neutral capacity being interposed therebetween, wherein the neutral capacity makes the rotation of the motor shaft zero regardless of the rotation state of the pump shaft, the first pump capacity is one of the forward rotation side that causes the motor shaft to rotate in the forward direction with respect to the rotational direction of the pump shaft and the reverse rotation side that causes the motor shaft to rotate in the reverse direction with respect to the rotational direction of the pump shaft, and the second pump shaft is the other one of the forward rotation side and the reverse rotation side. The pump-side output adjusting member 20 is operatively controlled by the control device 100 provided in the transmission structure 4.

Figure 9:
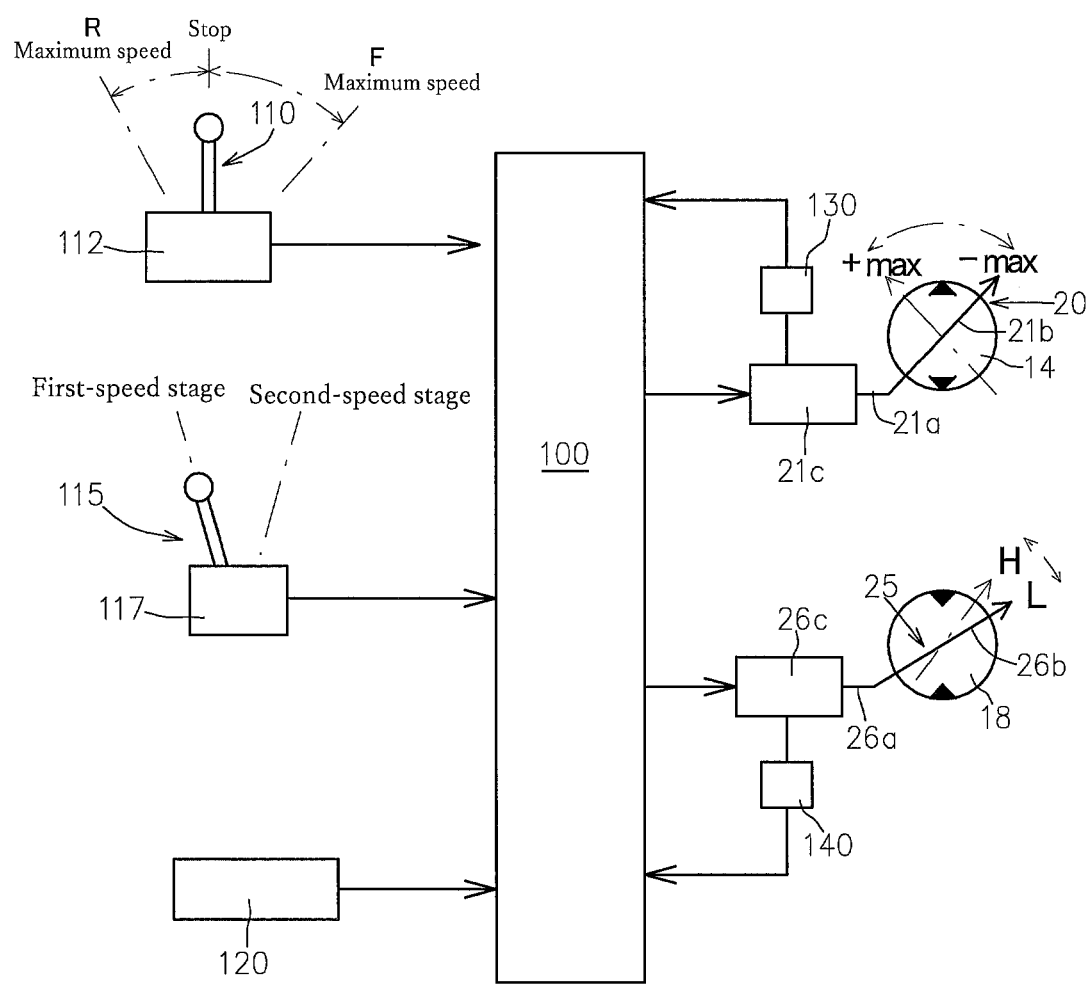
FIG. 9 is a control block diagram of a control device in the transmission structure according to the fourth embodiment.

FIG. 9 shows a control block diagram of the control device 100.

As shown in FIG. 9, the pump-side output adjusting member 20 has the pump-side control shaft 21*a* disposed on the pump-side swing axis orthogonal to the pump shaft 12, the pump-side movable swash plate 21*b* that is operatively connected to the pump-side control shaft 21*a* in such a manner as to be directly or indirectly engaged to the free ends of the pump-side pistons and swing around the pump-side swing axial line in accordance with the rotation of the pump-side control shaft 21*a* around the axial line so that the advance and retreat range of the pump-side piston is defined in accordance with a swing position of the pump-side movable swash plate 21*b* around the pump-side swing axial line, and the pump-side actuator 21*c* that rotates the pump-side control shaft 21*a* around the axial line.

As long as being operatively controllable by the control device 100, the pump-side actuator 21*c* can take various forms, such as an electro-hydraulic actuator including a solenoid valve and a hydraulic cylinder, or an electric actuator including an electric motor.

The pump body is set to have the first pump capacity and the second pump capacity, respectively, by the pump-side movable swash plate being swung at ends of one side and the other side around the pump-side swing axial line.

The first pump capacity of the pump body 14 is, for example, a reverse side capacity that rotates the motor shaft 16 in the reverse direction with respect to the rotational direction of the pump shaft 12, and the second pump capacity of the pump body 14 is a forward side capacity that rotates the motor shaft 16 in the forward direction with respect to the rotational direction of the pump shaft 12.

In this case, when the pump-side movable swash plate 21b is positioned in the neutral position around the pump-side swing axis, the pump body 14 has the neutral capacity (zero capacity) so that rotation of the motor shaft 16 becomes zero, regardless of whether the pump shaft 12 is rotating or not.

The motor body 18 is the variable-capacity axial piston machine having the motor-side cylinder block (not shown) supported by the motor shaft 16 in a relatively non-rotatable manner around the axial line with respect thereto, and motor-side pistons (not shown) housed in the motor-side cylinder block in a relatively non-rotatable manner around the axial line and in a slidable manner in the axial line direction with respect thereto; and the motor body 18 is configured so that the capacity is changed according to the advance and retreat range of the motor-side pistons. Piston motor systems can take various forms, including swash plate, swash shaft, and radial types The motor-side output adjusting member 25 is configured so as to be able to change the capacity of the motor body 18 between the predetermined low-speed motor capacity (L) and the predetermined high-speed motor capacity (H) that is smaller than the low-speed motor capacity.

As shown in FIG. 9, the motor-side output adjusting member 25 has the motor-side control shaft 26a disposed on the motor-side swing axis orthogonal to the motor shaft 16, the motor-side movable swash plate 26b that is operatively connected to the motor-side control shaft 26a in such a manner as to swing around the motor-side swing axis in accordance with the rotation of the motor-side control shaft 26a around the axial line in a state of being directly or indirectly engaged to the free ends of the motor-side piston, and the motor-side actuator 26c that rotates the motor-side control shaft 26a around the axial line.

As long as being operatively controllable by the control device 100, the motor-side actuator 26c can take various forms, such as an electro-hydraulic actuator including a solenoid valve and a hydraulic cylinder, or an electric actuator including an electric motor.

As the capacity of the motor body 18 becomes smaller, the rotation speed of the motor shaft 16 relative to the rotation speed of the pump shaft 12 increases.

Therefore, as the motor body 18 is changed in capacity from the low-speed motor capacity (large capacity) to the high-speed motor capacity (small capacity), the rotation speed of the motor shaft 16 increases.

As shown in FIG. 8, the second end portion of the pump shaft 12 on the other end side in the axial line direction is operatively connected to the PTO shaft 280 provided in the work vehicle 201.

In detail, as shown in FIG. 8, the work vehicle 201 has the PTO shaft 280, and the PTO transmission structure that forms the PTO system power-transmitting path from the pump shaft 12 to the PTO shaft 280.

In the present embodiment, the PTO transmission structure has the PTO drive shaft 260 connected to the second end portion of the pump shaft 12 on the other end side in the axial line direction in a relatively non-rotatable manner around the axial line with respect thereto, the first PTO transmission shaft 261 operatively connected to the PTO drive shaft 260 via the speed-reducing gear train 217, the second PTO transmission shaft 262, the PTO clutch mechanism 265 that engages and disengages the power transmission from the first PTO shaft 261 to the second PTO shaft 262, and the PTO speed-change mechanism 270 capable of changing, in multiple speed-change stages, the rotational power of the second PTO transmission shaft 262 and then transmitting the rotational power to the PTO shaft 280.

As shown in FIG. 8, the planetary gear mechanism 30 has the sun gear 32, the planetary gear 34 that meshes with the sun gear 32, the internal gear 36 that meshes with the planetary gear 34, and the carrier 38 that supports the planetary gear 34 in a rotatable manner around an axial line and rotates around the axial line of the sun gear 32 in conjunction with the revolution of the planetary gear 34 around the sun gear 32; and the sun gear 32, the carrier 38, and the internal gear 36 form three planetary elements.

The planetary gear mechanism 30 is configured so that, the reference rotation power from the driving source 210 is operatively input to the first element of the three planetary elements, the HST output from the motor shaft 16 is operatively input to the second element, and the combined rotational power, that is, an HMT output, which is made by combining the reference rotational power and the HST output is output from the third element.

As shown in FIG. 8, in the present embodiment, the internal gear 36 acts as the first element, the sun gear 32 acts as the second element, and the carrier 38 acts as the third element.

In detail, the sun gear 32 acting as the second element is supported on the sun gear shaft 32a in a relatively non-rotatable manner with respect thereto, and the sun gear shaft 32a is operatively connected to the motor shaft 16 via the gear train 215.

The cylindrical transmission shaft 36a is externally supported around the sun gear shaft 32a in a relatively rotatable manner with respect thereto.

The transmission shaft 36a is operatively connected to the PTO drive shaft 260 via the gear train 216.

The internal gear 36 acting as the first element is operatively connected to the transmission shaft 36a, and receives the rotary power from the driving source 210 via the pump shaft 12, the PTO drive shaft 260, the gear train 216, and the transmission shaft 36a.

The cylindrical planetary output shaft 39 is externally supported around the transmission shaft 36a in a relatively rotatable manner with respect thereto at a position different from the position where the transmission shaft 36a is externally supported. The carrier 38 acting as the third element is connected to the planetary output shaft 39.

As shown in FIG. 9, the transmission structure 4 further includes the manually operable speed-change operating member 110, the vehicle traveling speed sensor 120 that directly or indirectly detects the vehicle traveling speed of the work vehicle 201, the pump sensor 130 that directly or indirectly detects the capacity of the pump body 14, and the motor sensor 140 that directly or indirectly detects the capacity of the motor body 18.

The reference numeral 112 in FIG. 9 is a sensor that detects the operation state (operation position) of the speed-change operating member 110.

As long as the control device 100 can recognize the vehicle traveling speed, the vehicle traveling speed sensor 120 can be configured so as to detect the rotational speed of any rotating member in the power-transmitting path from the third element of the planetary gear mechanism 30 to the driving wheel 220.

As long as the control device 100 can recognize the capacities of the pump body 14 and the motor body 18, respectively, the pump sensor 130 and the motor sensor 140 can be configured in various ways.

The pump sensor 130 can be, for example, the sensor that detects the operating state of the pump-side actuator 21*c* or the sensor such as a potentiometer that detects a rotational angle around an axial line of the pump-side control shaft 21*a*.

Similarly, the motor sensor 140 can be, for example, the sensor that detects the operating state of the motor-side actuator 26*c* or the sensor such as a potentiometer that detects a rotational angle around an axial line of the motor-side control shaft 26*a*.

As shown in FIG. 8, the transmission structure 4 includes the auxiliary speed-change mechanism 70 that changes, in multiple speed-change stages, the combined rotational power of the planetary gear mechanism 30, which is operatively input, and outputs the speed-changed rotational power toward the driving wheel 220.

In the present embodiment, the auxiliary speed-change mechanism 70 is configured so as to make two speed-change stages: the first-speed stage which is a low-speed stage and the second-speed stager which is a high-speed stage.

In the present embodiment, the auxiliary speed-change mechanism 70 is configured so as to execute two speed-change stages between the travel transmission shaft 45 and the travel output shaft 47 that is disposed on a downstream side of the travel transmission shaft 45 in the transmission direction.

In detail, as shown in FIG. 8, the auxiliary speed-change mechanism 70 has the first-speed gear train 71(1) that can transmit the rotational power from the travel transmission shaft 45 to the travel output shaft 47 at a predetermined speed-change ratio, the second-speed gear train 71(2) that can transmit the rotary power from the travel transmission shaft 45 to the travel output shaft 47 at a speed-change ratio (speed-change ratio causing the travel output shaft 47 to rotate at high speed) higher than the predetermined speed-change ratio, the first-speed clutch mechanism 75(1) that engages and disengages the power transmission of the first-speed gear train 71(1), and the second-speed clutch mechanism 75(2) that engages and disengages the power transmission of the second-speed gear train 71(2).

In the present embodiment, the first-speed gear train 71(1) includes the first-speed driving gear 72(1) supported by the travel transmission shaft 45, and the first-speed driven gear 73(1) that is, in a state of being meshed with the first-speed driving gear 72(1), supported by the travel output shaft 47.

The second-speed gear train 71(2) includes the second-speed driving gear 72(2) that is supported by the travel transmission shaft 45 and that is larger in diameter than the first-speed driving gear 72(1), and the second-speed driven gear 73(2) that is, in a state of being meshed with the second-speed driving gear 72(2), supported by the travel output shaft 47 and that is smaller in diameter than the first-speed driven gear 73(1).

One of the driving-side gear group formed by the first-speed and second-speed driving gears 72(1) and 72(2), and the driven-side gear group formed by the first-speed and second-speed driven gears 73(1) and 73(2) is supported by the corresponding shaft in a relatively non-rotatable manner with respect thereto, and the other one is supported by the corresponding shaft in a relatively rotatable manner with respect thereto.

Based on the above, the first-speed and second-speed clutch mechanisms 75(1), 75(2) are configured so as to engage and disengage the gears that are supported by the corresponding shafts in a relatively rotatable manner with respect thereto.

In the present embodiment, as shown in FIG. 8, the driving-side gear group is supported by the corresponding travel transmission shaft 45 in a relatively rotatable manner with respect thereto; therefore, the first-speed clutch mechanism 75(1) is configured so as to selectively engage and disengage the first-speed driving gear 72(1) to and from the travel transmission shaft 45, and the second-speed clutch mechanism 75(2) is configured so as to selectively engage and disengage the second-speed driving gear 72(2) to and from the travel transmission shaft 45.

In the present embodiment, the first-speed clutch mechanism 75(1) and the second-speed clutch mechanism 75(2) each are of a dog clutch type.

In detail, the first-speed clutch mechanism 75(1) includes the first-speed slider supported on the corresponding shaft (in the present embodiment, the travel transmission shaft 45) in a relatively non-rotatable manner and in a movable manner in the axial line direction, and the first-speed concave-convex engagement portion that includes one of the concave and convex engagement portions provided on the opposing face of the first-speed driving gear 72(1), and the other of the concave and convex engagement portions provided on the opposing face of the first-speed slider.

The second-speed clutch mechanism 75(2) includes the second-speed stage slider supported by the corresponding shaft (in the present embodiment, the travel transmission shaft 45) in a relatively non-rotatable manner with respect thereto and in a movable manner in the axial line direction, and the second-speed concave-convex engagement portion that includes one of the concave and convex engagement portions provided on the opposing face of the second-speed driving gear 72(2) and the other of the concave and convex engagement portions provided on the opposing face of the second-speed stage slider.

In the present embodiment, the first-speed and second-speed stage sliders are formed by a single common slider. Although the above-mentioned clutch mechanisms 75(1), 75(2) each are of a constant-mesh (always engagement) type, this invention is not limited to the type. A sliding-mesh type (sliding engagement) type or synchromesh (constant velocity engagement) type may be utilized.

In the present embodiment, as shown in FIG. 9, the auxiliary speed-change mechanism 70 is configured so as to be operatively controlled by the control device 100 in accordance with the operation of the manually operable lever-shaped auxiliary speed-change operating member 115.

That is, the auxiliary speed-change mechanism 70 includes the auxiliary speed-change switching actuator that is formed by an electro-hydraulic actuator or an electric actuator and that actuates the first-speed slider and the second-speed stage slider (the common slider in the present embodiment).

Then, the control device 100 executes the operation control of the auxiliary speed-change switching actuator based on the signal from the sensor 117 that detects the operation state (operation position) of the auxiliary speed-change operating member 115.

Alternatively, the auxiliary speed-change switching actuator can also be configured so as to be actuated via the mechanical link in accordance with the manual operation of the auxiliary speed-change operating member 115.

The mechanical link is configured so as to actuate the first-speed slider and the second-speed stage slider (the common slider in the present embodiment) using mechanical movement of the auxiliary speed-change operating member 115 by the manual operation.

In this case as well, it is also possible to so configure that the control device 100 can recognize, by the sensor 117, the operation state (operation position) of the auxiliary speed-change operating member 115.

In the present embodiment, the work vehicle 201 has the pair of main driving wheels that act as the driving wheels 220, the pair of main driving axles 250 that drive the pair of main driving wheels respectively, and the differential gear mechanism 300; and the rotational power of the travel output shaft 47 is differentially transmitted to the pair of main driving axles 250 via the differential gear mechanism 300.

The reference numeral 255 in FIG. 8 is the travel brake mechanism that selectively applies a braking force to the main driving axle 250, and the reference numeral 310 is the differential lock mechanism that forcibly drives the pair of main driving axles 250 in a synchronized to each other by the rotational power from the travel output shaft 47.

A control structure by the above control device 100 is described below.

Figure 10A:
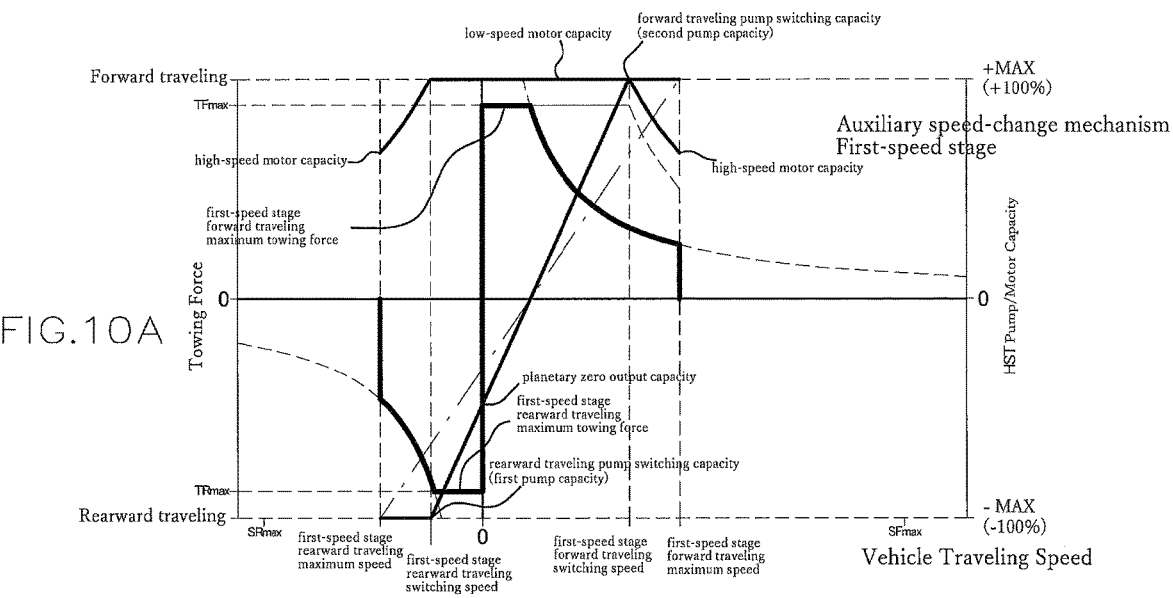
FIGS. 10A and 10B are graphs showing relation between vehicle traveling speed and towing force with respect to the HST capacity (capacities of the pump body and the motor body) in a work vehicle to which a transmission structure according to the fourth embodiment is applied, and are graphs when the auxiliary speed-change mechanism provided in the transmission structure is engaged with the first-speed stage (the low-speed stage) and the second-speed stage (the high-speed stage), respectively.
Figure 10B:
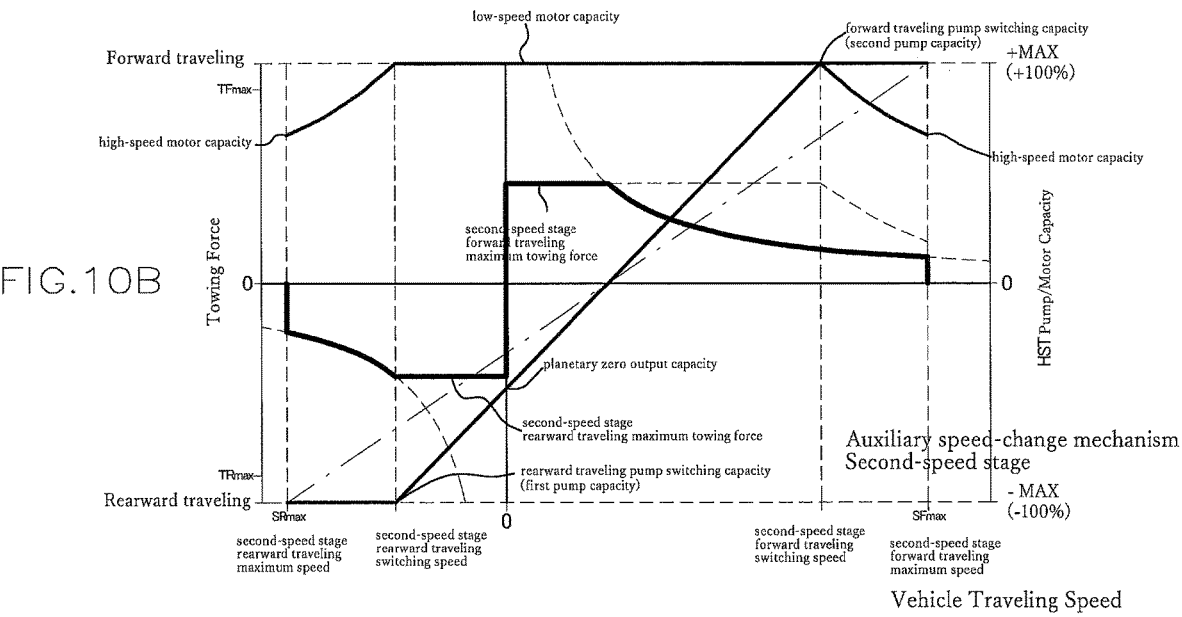

FIGS. 10A and 10B show the relation between the vehicle traveling speed and the towing force with respect to the HST capacity (capacities of the pump body 14 and the motor body 18) with the auxiliary speed-change mechanism 70 engaged with the first-speed stage and the second-speed stage, respectively.

Further, reference numerals SFmax and SRmax in the drawings are forward-side and rearward-side maximum vehicle traveling speeds to be required for the work vehicle 201, respectively. Reference numerals TFmax and TRmax are forward-side and rearward-side maximum towing forces to be required for the work vehicle 201, respectively.

As shown in FIGS. 10A and 10B, in the present embodiment, the planetary gear mechanism 30 is so set that the output (that is, the vehicle traveling speed) of the third element (in the present embodiment, the carrier 38) becomes zero speed when the pump body 14 is set to the planetary zero output capacity between the first pump capacity and the neutral capacity with the motor body 18 being set to the low-speed motor capacity, the rotational speed of the output of the third element increases in the forward side as the capacity of the pump body 14 is changed from the planetary zero output capacity via the neutral capacity to the second pump capacity, and the rotational speed of the output of the third element increases in the rearward side as the capacity of the pump body 14 is changed from the planetary zero output capacity to the first pump capacity.

In the present embodiment, the first pump capacity is set to the capacity on the reverse rotation side and the second pump capacity is set to the capacity on the forward rotation side; therefore, the planetary zero output capacity between the first pump capacity and the neutral capacity is the predetermined capacity on the reverse rotation side (−50% in FIGS. 10A and 10B).

As shown in FIGS. 10A and 10B, when the speed-change operating member 110 is positioned in the zero speed position (stop position), the control device 100 execute a stop control mode in which the motor-side output adjusting member 25 is operated so that the motor body 18 becomes the low-speed motor capacity while the pump-side output adjusting member 20 is operated so that the pump body 14 becomes the planetary zero output capacity to cause the output of the third element of the planetary gear mechanism 30 to become the zero speed.

Further, in a case where the speed-change operating member 110 is operated from the zero speed position to the forward side, when the vehicle traveling speed detected by the vehicle traveling speed sensor 120 is equal to or lower than the forward-side switching speed that is realized by the motor body 18 being set to the low-speed motor capacity and the pump body 14 being set to the predetermined forward-side pump switching capacity, the control device 100 executes a forward-side normal control mode in which the pump-side output adjusting member 20 is operated so that the vehicle traveling speed increases and reduces in the forward side in accordance with the forward-side speed-increasing and forward-side speed-reducing operations of the speed-change operating member 110 while the motor-side output adjusting member 25 being operated so that the motor body 18 is fixed at the low-speed motor capacity.

As shown in FIGS. 10A and 10B, in the present embodiment, the second pump capacity is set to the forward-side pump switching capacity, thereby expanding the speed range of the HMT output that can be varied by changing the capacity of the pump body 14. However, the present invention is not limited to such a configuration. Any pump capacity, such as a pump capacity of 90% of the second pump capacity, can be set as the forward-side pump switching capacity.

Then, when the vehicle traveling speed is higher than the forward-side switching speed, the control device 100 executes a forward-side high-speed control mode in which the motor-side output adjusting member 25 is operated so that the vehicle traveling speed increases and reduces in the forward side in accordance with the forward-side speed-increasing and forward-side speed-reducing operations of the speed-change operating member 110 while the pump-side output adjusting member 20 being operated so that the pump body 14 is fixed at the forward-side pump switching capacity.

Further, in a case where the speed-change operating member 110 is operated from the zero speed position to the rearward side, the control device 100 executes a rearward-side control mode in which the pump-side output adjusting member 20 is operated so that the vehicle traveling speed increases and reduces in the rearward side in accordance with the rearward-side speed-increasing and rearward-side speed-reducing operations of the speed-change operating member 110 while the motor-side output adjusting member 25 being operated so that the motor body 18 is fixed at the low-speed motor capacity.

According to the above configuration, it is possible to make switching between the forward travel output and the rearward output without providing a separate forward/rearward switching mechanism, and further, it is possible to expand the speed-changeable range of the forward output of the HMT while preventing the vehicle traveling speed from changing at the time of the switching between the forward-side normal control mode and the forward-side high-speed control mode.

Therefore, the range of the required maximum towing force Tmax and the required maximum vehicle traveling speed Smax, which could not be covered, in the conventional transmission structure (see FIG. 14 to FIG. 16), without providing the auxiliary speed-change mechanism 570 having three speed-change stages, can be covered only by providing the auxiliary speed-change mechanism 70 having two speed-change stages, thereby making the transmission structure of the work vehicle 201 compact and inexpensive.

In the present embodiment, the vehicle traveling speed sensor 120 is configured so as to detect the speed of the rotational power in the state after being subjected to the multiple-speed changing by the auxiliary speed-change mechanism 70 (that is, the travel output shaft 47, or the rotational member such as the main driving axle 250 on the downstream side of the travel output shaft 47 in the transmission direction); therefore, the control device 100 has, as the forward-side switching speed, a first-speed forward-side switching speed (FIG. 10A) and a second-speed forward-side switching speed (FIG. 10B) which are used in the first-speed transmission state and the second-speed transmission state of the auxiliary speed-change mechanism 70, respectively.

Alternatively, in a case where the vehicle traveling speed sensor 120 is configured so as to detect the rotational speed of the rotational power (for example, the rotational power of the third element 38, the planetary output shaft 39, or the travel transmission shaft 45) before being subjected to the multiple-speed changing by the auxiliary speed-change mechanism 70, the control device 100 is configured so as to execute an operation control using a single forward-side switching speed, regardless of the speed-change engagement state of the auxiliary speed-change mechanism 70.

In the present embodiment, the control device 100 has the following rearward-side normal control mode and rearward-side high-speed control mode as the rearward-side control mode, thereby expanding the speed-changeable range of the rearward output without causing a rapid speed change.

That is, as shown in FIGS. 10A and 10B, in a case where the speed-change operating member 110 is operated from the zero speed position to the rearward side, when the vehicle traveling speed is equal to or lower than the rearward-side switching speed that is realized by the motor body 18 being set to the low-speed motor capacity and the pump body 14 being set to the predetermined rearward-side pump switching capacity, the control device 100 executes a rearward-side normal control mode in which the pump-side output adjusting member 20 is operated so that the vehicle traveling speed increases and reduces in the rearward side in accordance with the rearward-side speed-increasing and rearward-side speed-reducing operations of the speed-change operating member 110 while the motor-side output adjusting member 25 being operated so that the motor body 18 is fixed at the low-speed motor capacity.

As shown in FIGS. 10A and 10B, in the present embodiment, the first pump capacity is set to the rearward-side pump switching capacity, thereby expanding the speed range of the HMT output that can be varied by the capacity change of the pump body 14. However, the present invention is not limited to the above configuration. Any pump capacity, such as a pump capacity of 90% (that is, −90%) of the first pump capacity, can be set as the rearward-side pump switching capacity.

Then, when the vehicle traveling speed is higher than the rearward-side switching speed, the control device 100 executes the rearward-side high-speed control mode in which the motor-side output adjusting member 25 is operated so that the vehicle traveling speed increases and reduces in the rearward side in accordance with the rearward-side speed-increasing and rearward-side speed-reducing operations of the speed-change operating member 110 while the pump-side output adjusting member 20 being operated so that the pump body 14 is fixed at the rearward-side pump switching capacity.

Further, for the rearward-side switching speed as well as the forward-side switching speed, in a case where the vehicle traveling speed sensor 120 is configured so as to detect the rotational speed of the rotational power (for example, the rotational power of the third element 38, the planetary output shaft 39, or the travel transmission shaft 45) in the state before being subjected to the multiple-speed changing by the auxiliary speed-change mechanism 70, the control device 100 is configured so as to execute the operation control using a single rearward-side switching speed, regardless of the speed-change engagement state of the auxiliary speed-change mechanism 70.

Fifth Embodiment

Another embodiment of the transmission structure will be described below with reference to the accompanying drawings.

Figure 11A:
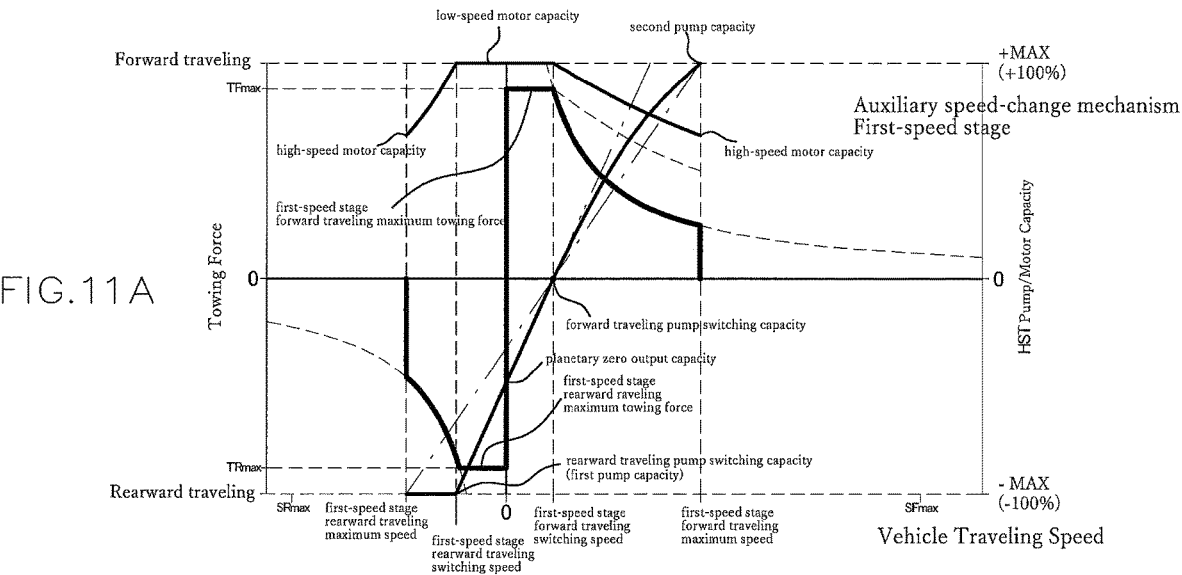
FIGS. 11A and 11B are graphs showing relation between vehicle traveling speed and towing force with respect to the HST capacity (capacities of the pump body and the motor body) in a work vehicle to which a transmission structure according to a fifth embodiment of the present invention is applied, and are graphs when the auxiliary speed-change mechanism provided in the transmission structure is engaged with the first-speed stage (the low-speed stage) and the second-speed stage (the high-speed stage), respectively.
Figure 11B:
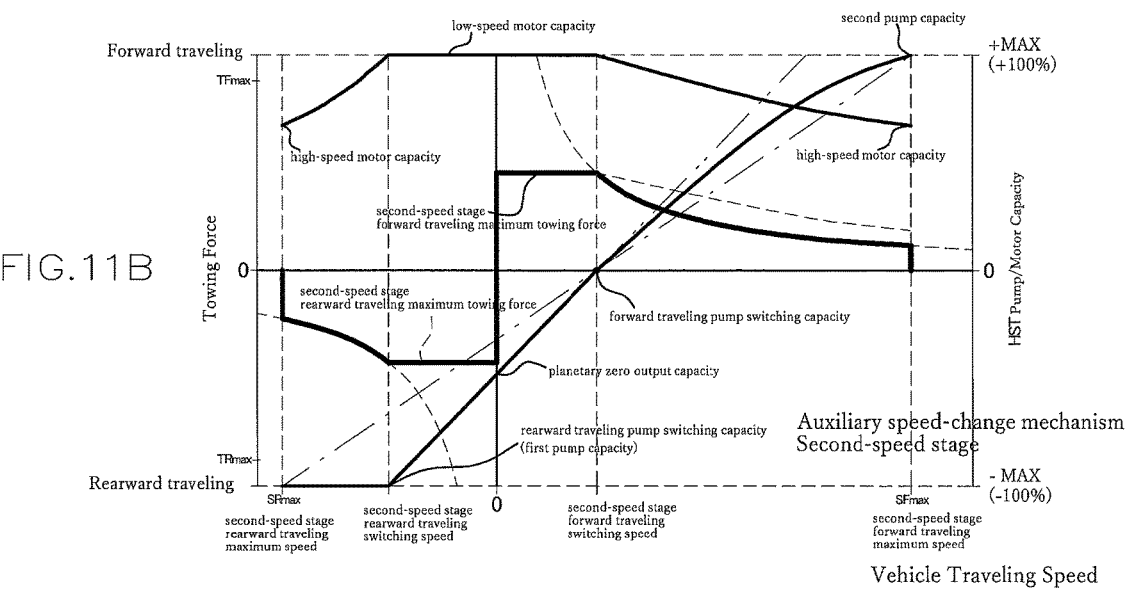

FIGS. 11A and 11B show the relation between the vehicle traveling speed and the towing force with respect to the HST capacity (capacities of the pump body 14 and motor body 18) with the auxiliary speed-change mechanism 70 engaged with the first-speed stage and the second-speed stage, respectively, in the transmission structure according to the present embodiment.

Further, reference numerals SFmax and SRmax in the drawings are required forward-side and rearward-side maximum vehicle traveling speeds for the work vehicle 201, respectively, and reference numerals TFmax and TRmax are required forward-side and rearward-side maximum towing forces for the work vehicle 201, respectively.

Further, the transmission schematic diagram of the work vehicle to which the transmission structure according to the present embodiment is applied will be the same as that in FIG. 8, and a control block diagram will be the same as that in FIG. 9.

The transmission structure according to the present embodiment is modified only in the forward-side control mode, compared to the transmission structure 4 according to the fourth embodiment.

That is, the control device of the transmission structure according to the present embodiment is so configured as to execute the control modes same as the stop control mode, the rearward-side normal control mode and the rearward-side high-speed control mode which are executed by the control device 100 in the transmission structure 4 according to the fourth embodiment, and meanwhile to execute a forward-side control mode that is different from the forward-side control mode executed by the control device 100.

As shown in FIGS. 11A and 11B, the forward-side control mode executed by the control device of the transmission structure according to the present embodiment has a forward-side normal control mode that is executed when the vehicle traveling speed is equal to or lower than the forward-side switching speed, and a forward-side high-speed control mode that is executed when the vehicle traveling speed is higher than the forward-side switching speed.

The forward-side normal control mode is substantially the same as the forward-side normal control mode in the fourth embodiment.

However, in the forward-side normal control mode of the present embodiment, the forward-side pump switching capacity is set to a capacity between the planetary zero output capacity and the second pump capacity.

The forward-side high-speed control mode is configured so that, in accordance with the forward-side speed-increasing operation of the speed-change operating member 110, the forward-side speed-increasing operation of the pump-side output adjusting member 20 that changes the capacity of the pump body 14 from the side of the forward-side pump switching capacity to the side of the second pump capacity and the speed-increasing operation of the motor-side output adjusting member 25 that changes the capacity of the motor body 18 from the side of the low-speed motor capacity to the side of the high-speed motor capacity are synchronously executed, and in accordance with the forward-side speed-reducing operation of the speed-change operating member 110, the forward-side speed-reducing operation of the pump-side output adjusting member 20 that changes the capacity of the pump body 14 from the side of the second pump capacity to the side of the forward-side pump switching capacity and the speed-reducing operation of the motor-side output adjusting member 25 that changes the capacity of the motor body 18 from the side of the high-speed motor capacity to the side of the low-speed motor capacity are synchronously executed.

The present embodiment having the above configuration can obtain the same effect as in the fourth embodiment.

As shown in FIGS. 11A and 11B, the forward-side pump switching capacity is set to the neutral capacity (zero capacity) that makes the rotation of the motor shaft 16 zero regardless of the rotation state of the pump shaft 12.

This configuration allows smooth switching between the forward-side normal control mode and the forward-side high-speed control mode.

The forward-side pump switching capacity can be set to a desired capacity other than the neutral capacity (zero capacity), between the planetary zero output capacity and the second pump capacity.

For example, the forward-side pump switching capacity can be set to the forward rotation side intermediate capacity (for example, +50%) between the neutral capacity and the second pump capacity.

Sixth Embodiment

Another embodiment of the transmission structure will be described below with reference to the accompanying drawings.

Figure 12A:
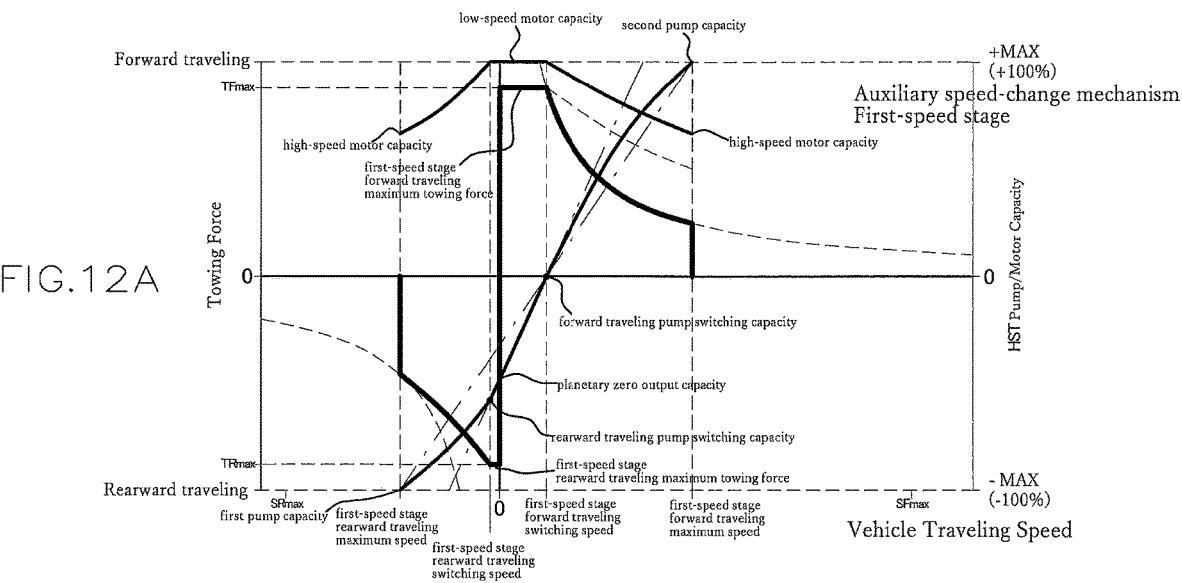
FIGS. 12A and 12B are graphs showing relation between vehicle traveling speed and towing force with respect to the HST capacity (capacities of the pump body and the motor body) in a work vehicle to which a transmission structure according to a sixth embodiment of the present invention is applied, and are graphs when the auxiliary speed-change mechanism provided in the transmission structure is engaged with the first-speed stage (the low-speed stage) and the second-speed stage (the high-speed stage), respectively.
Figure 12B:
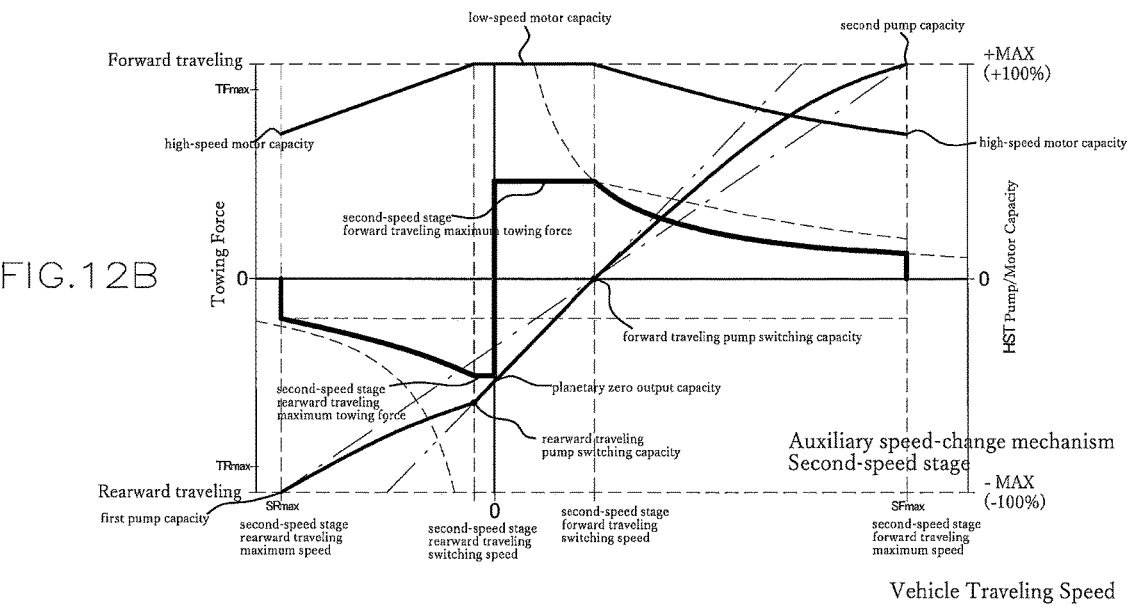

FIGS. 12A and 12B show the relation between the vehicle traveling speed and the towing force with respect to the HST capacity (capacities of the pump body 14 and the motor body 18) in the state where the above auxiliary speed-change mechanism 70 is engaged with the first-speed stage and the second-speed stage, respectively, in the transmission structure according to the present embodiment.

Further, reference numerals SFmax and SRmax in the drawings are required forward-side and rearward-side maximum vehicle traveling speeds for the work vehicle 201, respectively, and reference numerals TFmax and TRmax are required forward-side and rearward-side maximum towing forces for the work vehicle 201, respectively.

Further, the transmission schematic diagram of the work vehicle to which the transmission structure according to the present embodiment is applied will be the same as that in FIG. 8, and a control block diagram will be the same as that in FIG. 9.

The transmission structure according to the present embodiment is modified only in the rearward-side control mode, compared to the transmission structure according to the fifth embodiment.

That is, the control device of the transmission structure according to the present embodiment is configured so as to execute the control modes same as the stop control mode, the forward-side normal control mode and the forward-side high-speed control mode which are executed by the control device in the transmission structure according to the fifth embodiment, and meanwhile to execute a rearward-side control mode that is different from the rearward-side control mode executed by the control device of the fifth embodiment.

As shown in FIGS. 12A and 12B, the rearward-side control mode executed by the control device of the transmission structure according to the present embodiment has
a rearward-side normal control mode that is executed when the vehicle traveling speed is equal to or lower than the rearward-side switching speed that is realized by the motor body 18 being set to the low-speed motor capacity and the pump body 14 being set to the predetermined rearward-side pump switching capacity in a case where the speed-change operating member 110 being operated from the zero speed position to the rearward side, the rearward-side normal control mode causing the pump-side output adjusting member 20 to be operated so that the vehicle traveling speed increases and reduces in the rearward side in accordance with the rearward-side speed-increasing and rearward-side speed-reducing operations of the speed-change operating member 110 while causing the motor-side output adjusting member 25 to be operated so that the motor body 18 is fixed at the low-speed motor capacity, and
a rearward-side high-speed control mode that is executed when the vehicle traveling speed is higher than the rearward-side switching speed, the rearward-side high-speed control mode synchronously performing the rearward-side speed-increasing operation of the pump-side output adjusting member 20 and the speed-increasing operation of the motor-side output adjusting member 25 in accordance with the rearward-side speed-increasing operation of the speed-change operating member 110 while synchronously performing the rearward-side speed-reducing operation of the pump-side output adjusting member 20 and the speed-reducing operation of the motor-side output adjusting member 25 in accordance with the rearward-side speed-reducing operation of the speed-change operating member 110, the rearward-side speed-increasing operation of the pump-side output adjusting member 20 changing the capacity of the pump body 14 from the side of the rearward-side pump switching capacity to the side of the first pump capacity, the speed-increasing operation of the motor-side output adjusting member 25 changing the capacity of the motor body 18 from the side of the low-speed motor capacity to the side of the high-speed motor capacity, the rearward-side speed-reducing operation of the pump-side output adjusting member 20 changing the capacity of the pump body 14 from the side of the first pump capacity to the side of the rearward-side pump switching capacity, the speed-reducing operation of the motor-side output adjusting member 25 changing the capacity of the motor body 18 from the side of the high-speed motor capacity to the side of the low-speed motor capacity.

The present embodiment having the above configuration can obtain the same effect as in the fourth and fifth embodiments.

In the transmission structure according to the present embodiment, it is also possible to adopt the forward-side normal control mode and the forward-side high-speed control mode in the transmission structure 4 according to the fourth embodiment, as the forward-side control mode executed when the speed-change operating member 110 is operated to the forward side.

Seventh Embodiment

Still another embodiment of the transmission structure according to the present invention will be described below with reference to the accompanying drawings.

Figure 13A:
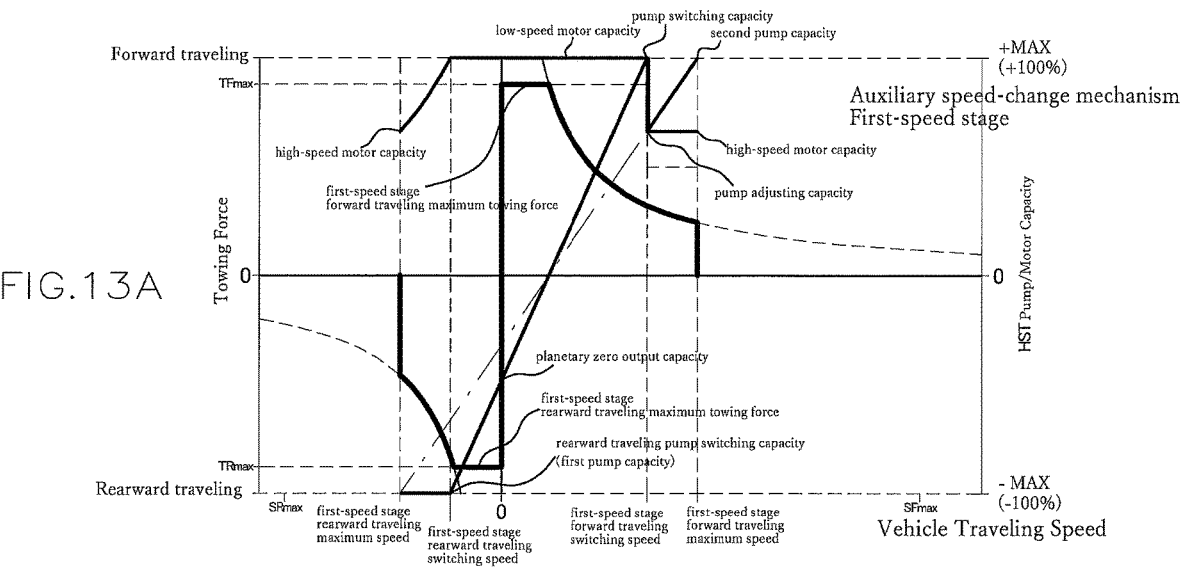
FIGS. 13A and 13B are graphs showing relation between vehicle traveling speed and towing force with respect to the HST capacity (capacities of the pump body and the motor body) in a work vehicle to which a transmission structure according to a seventh embodiment of the present invention is applied, and are graphs when the auxiliary speed-change mechanism provided in the transmission structure is engaged with the first-speed stage (the low-speed stage) and the second-speed stage (the high-speed stage), respectively.
Figure 13B:
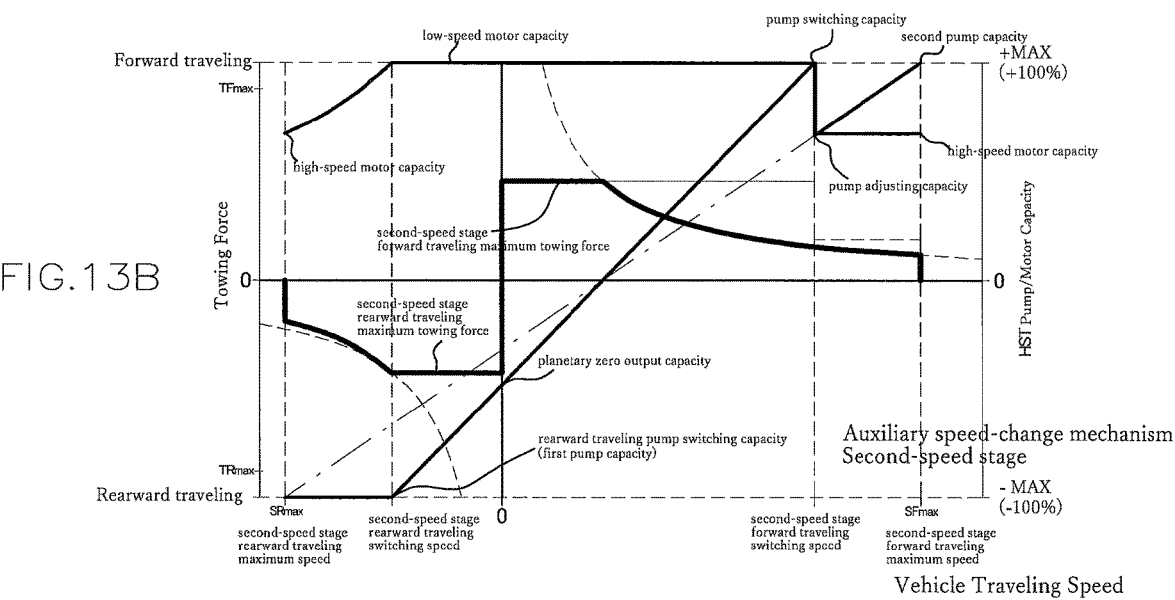

FIGS. 13A and 13B show the relation between the vehicle traveling speed and the towing force with respect to the HST capacity (capacities of the pump body and the motor body) in the state where the auxiliary speed-change mechanism 70 is engaged with the first-speed stage and the second-speed stage, respectively, in the transmission structure according to the present embodiment.

Further, reference numerals SFmax and SRmax in the drawings are required forward-side and rearward-side maximum vehicle traveling speeds for the work vehicle 201, respectively, and reference numerals TFmax and TRmax are required forward-side and rearward-side maximum towing forces for the work vehicle 201, respectively.

Further, the transmission schematic diagram of the work vehicle to which the transmission structure according to the present embodiment is applied will be the same as that in FIG. 8, and a control block diagram will be the same as that in FIG. 9.

The transmission structure according to the present embodiment is modified only in the forward-side control mode, compared to the transmission structure according to the fourth embodiment.

That is, the control device of the transmission structure according to the present embodiment is configured so as to execute the control modes same as the stop control mode, the rearward-side normal control mode and the rearward-side high-speed control mode which are executed by the control device 100 in the transmission structure 4 according to the fourth embodiment, and meanwhile to execute a forward-side control mode that is different from the forward-side control mode executed by the control device 100.

As shown in FIGS. 13A and 13B, the control device of the transmission structure according to the present embodiment, in a case where the speed-change operating member 110 is operated from the zero speed position to the forward side, executes a forward-side normal control mode same as the
    forward-side normal control mode of the fourth embodiment when the vehicle traveling speed is equal to or lower than the forward-side switching speed that is realized by the motor body 18 being set to the low-speed motor capacity and the pump body 14 being set to the forward-side pump switching capacity, executes a forward-side high-speed transition switching control mode when the vehicle traveling speed reaches the forward-side switching speed from the low-speed side, the forward-side high-speed transition switching control mode causing the motor-side output adjusting member 25 to be operated so that the capacity of the motor body 18 changes from the low-speed motor capacity to the high-speed motor capacity, and causing, at the same time, the pump-side output adjusting member 20 to be operated so that the capacity of the pump body 14 becomes the forward-side pump adjusting capacity that can maintain the vehicle traveling speed at the forward-side switching speed in a state of the motor body 18 being set to the high-speed motor capacity, executes the forward-side high-speed control mode when the vehicle traveling speed is higher than the forward-side switching speed, the forward-side high-speed control mode causing the pump-side output adjusting member 20 to be operated so that the pump capacity is changed from the side of the pump adjusting capacity to the side of the second pump capacity to increase the vehicle traveling speed in accordance with the speed-increasing operation of the speed-change operating member 110 and causing the pump-side output adjusting member 20 to be operated so that the pump capacity is changed from the side of the second pump capacity to the side of the pump adjusting capacity to reduce the vehicle traveling speed in accordance with the speed-reducing operation of the speed-change operating member 110, while causing the motor-side output adjusting member 25 to be operated so that the motor body 18 is fixed at the high-speed motor capacity, and executes the normal transition switching control mode when the vehicle traveling speed reaches the forward-side switching speed from the high-speed side, the normal transition switching control mode causing the motor-side output adjusting member 25 to be operated so that the capacity of the motor body 18 changes from the high-speed motor capacity to the low-speed motor capacity and causing, at the same time, the pump-side output adjusting member 20 to be operated so that the capacity of the pump body 14 changes from the pump adjusting capacity to the pump switching capacity.

The present embodiment having the above configuration can obtain the same effect as in the fourth and fifth embodiments.

In the present embodiment, the control device is configured so as to execute, when the speed-change operating member 110 is operated to the rearward side, the rearward-side control mode same as the rearward-side control modes in the fourth and fifth embodiments. Alternatively, the control device can be configured so as to execute the rearward-side control mode in the sixth embodiment.

In the transmission structures according to the fourth to sixth embodiments, it is also possible to change the rearward-side control mode to a control mode similar to the forward-side control mode of the transmission structure according to the seventh embodiment.

That is, in the transmission structure according to the fourth to seventh embodiments, the rearward-side control mode executed by the control device when the speed-change operating member 110 is operated from the zero speed position to the rearward side can be modified so as to have
    a rearward-side normal control mode that is executed when the vehicle traveling speed is equal to or lower than the rearward-side switching speed that is realized by the motor body 18 being set to the low-speed motor capacity and the pump body 14 being set to the predetermined rearward-side pump switching capacity, a rearward-side high-speed transition switching control mode that is executed when the vehicle traveling speed reaches the rearward-side switching speed from the low-speed side, a rearward-side high-speed control mode that is executed when the vehicle traveling speed is higher than the rearward-side switching speed, and a rearward-side normal transition control mode that is executed when the vehicle traveling speed reaches the rearward-side switching speed from the high-speed side.

The rearward-side normal control mode operates the pump-side output adjusting member 20 so that the vehicle traveling speed increases and reduces in the rearward side in accordance with the rearward-side speed-increasing and rearward-side speed-reducing operations of the speed-change operating member 110 while operating the motor-side output adjusting member 25 so that the motor body 18 is fixed at the low-speed motor capacity.

The rearward-side high-speed transition switching control mode operates the motor-side output adjusting member 25 so that the capacity of the motor body 18 changes from the low-speed motor capacity to the high-speed motor capacity, and operates, at the same time, the pump-side output adjusting member 20 so that the capacity of the pump body 14 becomes the rearward-side pump adjusting capacity that can maintain the vehicle traveling speed at the rearward-side switching speed in a state of the motor body 18 being set to the high-speed motor capacity.

The rearward-side high-speed control mode operates the pump-side output adjusting member 20 so that the vehicle traveling speed increases and reduces in the rearward side in accordance with the rearward-side speed-increasing and rearward-side speed-reducing operations of the speed-change operating member 110 while operating the motor-side output adjusting member 25 so that the motor body 18 is fixed at the high-speed motor capacity.

The rearward-side normal transition control mode operates the motor-side output adjusting member 25 so that the capacity of the motor body 18 changes from the high-speed motor capacity to the low-speed motor capacity, and operating, at the same time, the pump-side output adjusting member 20 so that the capacity of the pump body 14 changes from the rearward-side pump adjusting capacity to the rearward-side pump switching capacity.

DESCRIPTION OF THE REFERENCE NUMERALS 1, 4 transmission structure
10 HST
12 pump shaft
14 pump body
16 motor shaft
18 motor body
20 pump-side output adjusting member
25 motor-side output adjusting member
30 planetary gear mechanism
50 forward/rearward switching mechanism
70 auxiliary speed-change mechanism
100 control device
110 speed-change operating member
120 vehicle traveling speed sensor
130 pump sensor
140 motor sensor
200, 201 work vehicle
210 driving source

The invention claimed is:

1. A transmission structure interposed in a traveling-system power-transmitting path of a work vehicle, comprising:

an HST that includes a pump shaft operatively receiving a rotational power from a driving source provided in the work vehicle, a pump body supported by the pump shaft, a pump-side output adjusting member continuously varying a capacity of the pump body between first and second pump capacities, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity;

a planetary gear mechanism that includes first to three elements and that is configured to combine a reference rotational power operatively transmitted from the driving source to the first element and an HST output operatively transmitted from the motor shaft to the second element and output a combined rotational power from the third element, the planetary gear mechanism being set so that the speed of the combined rotational power output from the third element is increased as the HST output is varied in accordance with the change of the capacity of the pump body from the first pump capacity to the second pump capacity;

a manually operable speed-change operating member;

a vehicle traveling speed sensor that directly or indirectly detects a vehicle traveling speed of the work vehicle;

a pump sensor that directly or indirectly detects the capacity of the pump body;

a motor sensor that directly or indirectly detects the capacity of the motor body; and a control device that executes operation control of the pump-side output adjusting member and the motor-side output adjusting member, wherein, when the vehicle traveling speed detected by the vehicle traveling speed sensor is equal to or lower than a switching speed that is realized by the motor body being set to the low-speed motor capacity and the pump body being set to a predetermined pump switching capacity, the control device operates the pump-side output adjusting member so that the vehicle traveling speed increases and reduces in accordance with speed-increasing and speed-reducing operations of the speed-change operating member while operating the motor-side output adjusting member so that the motor body is fixed at the low-speed motor capacity, and wherein, when the vehicle traveling speed is higher than the switching speed, the control device operates the motor-side output adjusting member so that the vehicle traveling speed increases and reduces in accordance with the speed-increasing and speed-reducing operations of the speed-change operating member while operating the pump-side output adjusting member so that the pump body is fixed at the pump switching capacity.

2. The transmission structure according to claim 1 or 1, wherein the pump switching capacity is set to the second pump capacity.

3. The transmission structure according to claim 1, further comprising a forward/rearward switching mechanism capable of selectively taking a forward transmission state of outputting the combined rotational power operatively transmitted from the third element as a rotational power for a vehicle forward movement and a rearward transmission state of outputting the combined rotational power as a rotational power for a vehicle rearward movement, wherein the planetary gear mechanism is so set that the rotational speed of the output of the third element becomes zero speed when the pump body is set to a predetermined planetary zero output capacity with the motor body being set to the low-speed motor capacity, and the output of the third element increases in one direction around an axial line as the capacity of the pump body is changed from the planetary zero output capacity to the second pump capacity, and wherein the control device operates the pump-side output adjusting member so that the pump body has the planetary zero output capacity while operating the motor-side output adjusting member so that the motor body has the low-speed motor capacity when the speed-change operating member is positioned in the zero speed position.

4. The transmission structure according to claim 3, wherein the planetary zero output capacity is set to the first pump capacity.

5. The transmission structure according to claim 3,
wherein the speed-change operating member is capable of being operated from the zero speed position to forward and rearward sides, and wherein the control device operates the forward/rearward switching mechanism so as to take the forward and rearward transmission states, respectively, in accordance with the operations of the speed-change operating member from the zero speed position to forward and rearward sides.

6. The transmission structure according to claim 3, further comprising a manually operable forward/rearward switch operating member, wherein the control device operates the forward/rearward switching mechanism so as to take the forward and rearward transmission states in accordance with the operation of the forward/rearward switch operating member.

7. The transmission structure according to claim 1,
wherein the HST is configured so that the motor shaft rotates in the forward and rearward directions with respect to the rotational direction of the pump shaft when the pump body is set to the first and second pump capacities, respectively, and the rotation of the motor shaft is made zero regardless of the rotation state of the pump shaft when the pump body is set to a neutral capacity, and wherein the planetary gear mechanism is set so that the rotational speed of the output of the third element becomes zero speed when the pump body is set to the planetary zero output capacity between the first pump capacity and the neutral capacity with the motor body being set to the low-speed motor capacity, the rotational speed of the output of the third element increases in the forward side as the capacity of the pump body is changed from the planetary zero output capacity to the second pump capacity, and the rotational speed of the output of the third element increases in the rearward side as the capacity of the pump body is changed from the planetary zero output capacity to the first pump capacity.

8. A transmission structure interposed in a traveling-system power-transmitting path of a work vehicle, comprising:

an HST that includes a pump shaft operatively receiving a rotational power from a driving source provided in the work vehicle, a pump body supported by the pump shaft, a pump-side output adjusting member continuously varying a capacity of the pump body between first and second pump capacities, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity;

a planetary gear mechanism that includes first to three elements and that is configured to combine a reference rotational power operatively transmitted from the driving source to the first element and an HST output operatively transmitted from the motor shaft to the second element and output a combined rotational power from the third element, the planetary gear mechanism being set so that the speed of the combined rotational power output from the third element is increased as the HST output is varied in accordance with the change of the capacity of the pump body from the first pump capacity to the second pump capacity;

a manually operable speed-change operating member;
a vehicle traveling speed sensor that directly or indirectly detects a vehicle traveling speed of the work vehicle;
a pump sensor that directly or indirectly detects the capacity of the pump body;
a motor sensor that directly or indirectly detects the capacity of the motor body; and
a control device that executes operation control of the pump-side output adjusting member and the motor-side output adjusting member, wherein, when the vehicle traveling speed detected by the vehicle traveling speed sensor is equal to or lower than a switching speed that is realized by the motor body being set to the low-speed motor capacity and the pump body being set to a predetermined pump switching capacity between the first and second pump capacities, the control device operates the pump-side output adjusting member so that the vehicle traveling speed increases and reduces in accordance with the speed-increasing and speed-reducing operations of the speed-change operating member while operating the motor-side output adjusting member so that the motor body is fixed at the low-speed motor capacity, and wherein, when the vehicle traveling speed is higher than the switching speed, the control device synchronously executes speed-increasing operations of the pump-side output adjusting member and the motor-side output adjusting member in accordance with the speed-increasing operation of the speed-change operating member and also synchronously executing speed-reducing operations of the pump-side output adjusting member and the motor-side output adjusting member in accordance with the speed-reducing operation of the speed-change operating member, wherein the speed-increasing operation of the pump-side output adjusting member changes the capacity of the pump body from the side of the pump switching capacity to the side of the second pump capacity, the speed-increasing operation of the motor-side output adjusting member changes the capacity of the motor body from the side of the low-speed motor capacity to the side of the high-speed motor capacity, the speed-reducing operation of the pump-side output adjusting member changes capacity of the pump body from the side of the second pump capacity to the side of the pump switching capacity, and the speed-reducing operation of the motor-side output adjusting member changes the capacity of the motor body from the side of the high-speed motor capacity to the side of the low-speed motor capacity.

9. The transmission structure according to claim 8, wherein the pump switching capacity is set to a neutral capacity that makes the rotation of the motor shaft zero regardless of the rotation state of the pump shaft.

10. A transmission structure interposed in a traveling-system power-transmitting path of a work vehicle, comprising:
- an HST that includes a pump shaft operatively receiving a rotational power from a driving source provided in the work vehicle, a pump body supported by the pump shaft, a pump-side output adjusting member continuously varying a capacity of the pump body between first and second pump capacities, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity;
- a planetary gear mechanism that includes first to three elements and that is configured to combine a reference rotational power operatively transmitted from the driving source to the first element and an HST output operatively transmitted from the motor shaft to the second element and output a combined rotational power from the third element, the planetary gear mechanism being set so that the speed of the combined rotational power output from the third element is increased as the HST output is varied in accordance with the change of the capacity of the pump body from the first pump capacity to the second pump capacity;
- a manually operable speed-change operating member;
- a vehicle traveling speed sensor that directly or indirectly detects a vehicle traveling speed of the work vehicle;
- a pump sensor that directly or indirectly detects the capacity of the pump body;
- a motor sensor that directly or indirectly detects the capacity of the motor body; and
- a control device that executes operation control of the pump-side output adjusting member and the motor-side output adjusting member,
- wherein, when the vehicle traveling speed detected by the vehicle traveling speed sensor is lower than a switching speed that is realized by the motor body being set to the low-speed motor capacity and the pump body being set to a predetermined pump switching capacity, the control device operates the pump-side output adjusting member so that the vehicle traveling speed increases and reduces in accordance with the speed-increasing and speed-reducing operations of the speed-change operating member while operating the motor-side output adjusting member so that the motor body is fixed at the low-speed motor capacity,
- when the vehicle traveling speed reaches the switching speed from the low-speed side, the control device operates the motor-side output adjusting member so that the capacity of the motor body changes from the low-speed motor capacity to the high-speed motor capacity and operates, at the same time, the pump-side output adjusting member so that the capacity of the pump body becomes a pump adjusting capacity that can maintain the vehicle traveling speed at the switching speed in the state of the motor body being set to the high-speed motor capacity,
- wherein, when the vehicle traveling speed is higher than the switching speed, the control device operates the pump-side output adjusting member so that the vehicle traveling speed increases and reduces in accordance with the speed-increasing and speed-reducing operations of the speed-change operating member while operating the motor-side output adjusting member so that the motor body is fixed at the high-speed motor capacity, and
- wherein, when the vehicle traveling speed reaches the switching speed from the high-speed side, the control device operates the motor-side output adjusting member so that the capacity of the motor body changes from the high-speed motor capacity to the low-speed motor capacity and operates, at the same time, the pump-side output adjusting member so that the capacity of the pump body changes from the pump adjusting capacity to the pump switching capacity.

11. A transmission structure interposed in a traveling-system power-transmitting path of a work vehicle, comprising:
- an HST that includes a pump shaft operatively receiving a rotational power from a driving source provided in the work vehicle, a pump body supported by the pump shaft, a pump-side output adjusting member continuously varying a capacity of the pump body, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity;
- a planetary gear mechanism that includes first to three elements and that is configured to combine a reference rotational power operatively transmitted from the driving source to the first element and an HST output operatively transmitted from the motor shaft to the second element and output a combined rotational power from the third element;
- a manually operable speed-change operating member;
- a vehicle traveling speed sensor that directly or indirectly detects a vehicle traveling speed of the work vehicle;
- a pump sensor that directly or indirectly detects the capacity of the pump body;
- a motor sensor that directly or indirectly detects the capacity of the motor body; and
- a control device that executes operation control of the pump-side output adjusting member and the motor-side output adjusting member,
- wherein pump-side output adjusting member is configured so as to continuously vary the capacity of the pump body between first and second pump capacities with a neutral capacity being interposed therebetween, the neutral capacity making the rotation of the motor shaft zero regardless of the rotation state of the pump shaft, the first pump capacity being one of a forward rotation side that causes the motor shaft to rotate in a forward direction with respect to the rotational direction of the pump shaft and a reverse rotation side that causes the motor shaft to rotate in a reverse direction with respect to the rotational direction of the pump shaft, the second pump capacity being the other of the forward and reverse rotation sides,
- wherein the planetary gear mechanism is so set that the rotational speed of the output of the third element becomes zero speed when the pump body is set to a planetary zero output capacity between the first pump capacity and the neutral capacity with the motor body being set to the low-speed motor capacity, the rotational speed of the output of the third element increases in the forward side as the capacity of the pump body is changed from the planetary zero output capacity via the neutral capacity to the second pump capacity, and the rotational speed of the output of the third element increases in the rearward side as the capacity of the pump body is changed from the planetary zero output capacity to the first pump capacity, wherein, when the speed-change operating member is positioned in a zero speed position, the control device operates the motor-side output adjusting member so that the motor body has the low-speed motor capacity while operating the pump-side output adjusting member so that the pump body has the planetary zero output capacity, wherein, when the vehicle traveling speed detected by the vehicle traveling speed sensor is equal to or lower than a forward-side switching speed that is realized by the motor body being set to the low-speed motor capacity and the pump body being set to a predetermined forward-side pump switching capacity, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the low-speed motor capacity, wherein, when the vehicle traveling speed is higher than the forward-side switching speed, in the case where the speed-change operating member is operated from the zero speed position to the forward side, the control device operates the motor-side output adjusting member so that the vehicle traveling speed increases and reduces in the forward side in accordance with the forward-side speed-increasing and forward-side speed-reducing operations of the speed-change operating member while operating the pump-side output adjusting member so that the pump body is fixed at the forward-side pump switching capacity, and wherein, when the speed-change operating member is operated from the zero speed position to the rearward side, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity.

12. The transmission structure according to claim 11, wherein the forward-side pump switching capacity is set to the second pump capacity.

13. The transmission structure according to claim 11, wherein, when the vehicle traveling speed is equal to or lower than the rearward-side switching speed that is realized by the motor body being set to the low-speed motor capacity and the pump body being set to a predetermined rearward-side pump switching capacity, in a case where the speed-change operating member is operated from the zero speed position to the rearward, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity, and when the vehicle traveling speed is higher than the rearward-side switching speed, in a case where the speed-change operating member is operated from the zero speed position to the rearward, the control device operates the motor-side output adjusting member so that the vehicle traveling speed increases and reduces in the rearward side in accordance with the rearward-side speed-increasing and rearward-side speed-reducing operations of the speed-change operating member while operating the pump-side output adjusting member so that the pump body is fixed at the rearward-side pump switching capacity.

14. The transmission structure according to claim 13, wherein the rearward-side pump switching capacity is set to the first pump capacity.

15. The transmission structure according to claim 13, further comprising an auxiliary speed-change mechanism that changes, in multiple speed-change stages, the speed of the rotational power operatively transmitted from the third element.

16. The transmission structure according to claim 11, wherein, when the vehicle traveling speed is equal to or lower than the rearward-side switching speed that is realized by the motor body being set to the low-speed motor capacity and the pump body being set to a predetermined rearward-side pump switching capacity, in a case where the speed-change operating member is operated from the zero speed position to the rearward, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity, and when the vehicle traveling speed is higher than the rearward-side switching speed, in a case where the speed-change operating member is operated from the zero speed position to the rearward, the control device synchronously performs the rearward-side speed-increasing operation of the pump-side output adjusting member and the speed-increasing operation of the motor-side output adjusting member in accordance with the rearward-side speed-increasing operation of the speed-change operating member while synchronously performs the rearward-side speed-reducing operation of the pump-side output adjusting member and the speed-reducing operation of the motor-side output adjusting member in accordance with the rearward-side speed-reducing operation of the speed-change operating member, the rearward-side speed-increasing operation of the pump-side output adjusting member changing the capacity of the pump body from the side of the rearward-side pump switching capacity to the side of the first pump capacity, the speed-increasing operation of the motor-side output adjusting member changing the capacity of the motor body from the side of the low-speed motor capacity to the side of the high-speed motor capacity, the rearward-side speed-reducing operation of the pump-side output adjusting member changing the capacity of the pump body from the side of the first pump capacity to the side of the rearward-side pump switching capacity, the speed-reducing operation of the motor-side output adjusting member changing the capacity of the motor body from the side of the high-speed motor capacity to the side of the low-speed motor capacity.

17. The transmission structure according to claim 11, wherein, in a case where the speed-change operating member is operated from the zero speed position to the rearward, when the vehicle traveling speed is equal to or lower than the rearward-side switching speed that is realized by the motor body being set to the low-speed motor capacity and the pump body being set to a predetermined rearward-side pump switching capacity, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity, when the vehicle traveling speed reaches the rearward-side switching speed from the low-speed side, the control device operates the motor-side output adjusting member so that the capacity of the motor body changes from the low-speed motor capacity to the high-speed motor capacity, and operates, at the same time, the pump-side output adjusting member so that the capacity of the pump body becomes a rearward-side pump adjusting capacity that can maintain the vehicle traveling speed at the rearward-side switching speed in a state of the motor body being set to the high-speed motor capacity, when the vehicle traveling speed is higher than the rearward-side switching speed, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the high-speed motor capacity, and when the vehicle traveling speed reaches the rearward-side switching speed from the high-speed side, the control device operates the motor-side output adjusting member so that the capacity of the motor body changes from the high-speed motor capacity to the low-speed motor capacity, and operates, at the same time, the pump-side output adjusting member so that the capacity of the pump body changes from the rearward-side pump adjusting capacity to the rearward-side pump switching capacity.

18. A transmission structure interposed in a traveling-system power-transmitting path of a work vehicle, comprising:

an HST that includes a pump shaft operatively receiving a rotational power from a driving source provided in the work vehicle, a pump body supported by the pump shaft, a pump-side output adjusting member continuously varying a capacity of the pump body, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity;

a planetary gear mechanism that includes first to three elements and that is configured to combine a reference rotational power operatively transmitted from the driving source to the first element and an HST output operatively transmitted from the motor shaft to the second element and output a combined rotational power from the third element;

a manually operable speed-change operating member;

a vehicle traveling speed sensor that directly or indirectly detects a vehicle traveling speed of the work vehicle;

a pump sensor that directly or indirectly detects the capacity of the pump body;

a motor sensor that directly or indirectly detects the capacity of the motor body; and a control device that executes operation control of the pump-side output adjusting member and the motor-side output adjusting member, wherein pump-side output adjusting member is configured so as to continuously vary the capacity of the pump body between first and second pump capacities with a neutral capacity being interposed therebetween, the neutral capacity making the rotation of the motor shaft zero regardless of the rotation state of the pump shaft, the first pump capacity being one of a forward rotation side that causes the motor shaft to rotate in a forward direction with respect to the rotational direction of the pump shaft and a reverse rotation side that causes the motor shaft to rotate in a reverse direction with respect to the rotational direction of the pump shaft, the second pump capacity being the other of the forward and reverse rotation sides, wherein the planetary gear mechanism is so set that the rotational speed of the output of the third element becomes zero speed when the pump body is set to a planetary zero output capacity between the first pump capacity and the neutral capacity with the motor body being set to the low-speed motor capacity, the rotational speed of the output of the third element increases in the forward side as the capacity of the pump body is changed from the planetary zero output capacity via the neutral capacity to the second pump capacity, and the rotational speed of the output of the third element increases in the rearward side as the capacity of the pump body is changed from the planetary zero output capacity to the first pump capacity, wherein, when the speed-change operating member is positioned in a zero speed position, the control device operates the motor-side output adjusting member so that the motor body has the low-speed motor capacity while operating the pump-side output adjusting member so that the pump body has the planetary zero output capacity, wherein, when the vehicle traveling speed detected by the vehicle traveling speed sensor is equal to or lower than a forward-side switching speed that is realized by the motor body being set to the low-speed motor capacity and the pump body being set to a predetermined forward-side pump switching capacity, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the low-speed motor capacity, wherein, when the vehicle traveling speed is higher than the forward-side switching speed in the case where the speed-change operating member is operated from the zero speed position to the forward side, the control device synchronously executes a forward-side speed-increasing operation of the pump-side output adjusting member and a speed-increasing operation of the motor-side output adjusting member in accordance with the forward-side speed-increasing operation of the speed-change operating member while synchronously executing forward-side speed-reducing operation of the speed-change operating member and a speed-reducing operation of the motor-side output adjusting member in accordance with the forward-side speed-reducing operation of the speed-change operating member, wherein the forward-side speed-increasing operation of the pump-side output adjusting member changes the capacity of the pump body from the side of the forward-side pump switching capacity to the side of the second pump capacity, the speed-increasing operation of the motor-side output adjusting member changes the capacity of the motor body from the side of the low-speed motor capacity to the side of the high-speed motor capacity, the forward-side speed-reducing operation of the pump-side output adjusting member changes the capacity of the pump body from the side of the second pump capacity to the side of the forward-side pump switching capacity, and the speed-reducing operation of the motor-side output adjusting member changes the capacity of the motor body from the side of the high-speed motor capacity to the side of the low-speed motor capacity, and wherein, when the speed-change operating member is operated from the zero speed position to the rearward side, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity.

19. The transmission structure according to claim 18, wherein the pump switching capacity is set to the neutral capacity.

20. A transmission structure interposed in a traveling-system power-transmitting path of a work vehicle, comprising:

an HST that includes a pump shaft operatively receiving a rotational power from a driving source provided in the work vehicle, a pump body supported by the pump shaft, a pump-side output adjusting member continuously varying a capacity of the pump body, a motor shaft, a motor body supported by the motor shaft and fluidly connected to the pump body, and a motor-side output adjusting member varying a capacity of the motor body between a low-speed motor capacity and a high-speed motor capacity smaller than the low-speed motor capacity;

a planetary gear mechanism that includes first to three elements and that is configured to combine a reference rotational power operatively transmitted from the driving source to the first element and an HST output operatively transmitted from the motor shaft to the second element and output a combined rotational power from the third element;

a manually operable speed-change operating member;

a vehicle traveling speed sensor that directly or indirectly detects a vehicle traveling speed of the work vehicle;

a pump sensor that directly or indirectly detects the capacity of the pump body;

a motor sensor that directly or indirectly detects the capacity of the motor body; and a control device that executes operation control of the pump-side output adjusting member and the motor-side output adjusting member, wherein pump-side output adjusting member is configured so as to continuously vary the capacity of the pump body between first and second pump capacities with a neutral capacity being interposed therebetween, the neutral capacity making the rotation of the motor shaft zero regardless of the rotation state of the pump shaft, the first pump capacity being one of a forward rotation side that causes the motor shaft to rotate in a forward direction with respect to the rotational direction of the pump shaft and a reverse rotation side that causes the motor shaft to rotate in a reverse direction with respect to the rotational direction of the pump shaft, the second pump capacity being the other of the forward and reverse rotation sides, and wherein the planetary gear mechanism is so set that the rotational speed of the output of the third element becomes zero speed when the pump body is set to a planetary zero output capacity between the first pump capacity and the neutral capacity with the motor body being set to the low-speed motor capacity, the rotational speed of the output of the third element increases in the forward side as the capacity of the pump body is changed from the planetary zero output capacity via the neutral capacity to the second pump capacity, and the rotational speed of the output of the third element increases in the rearward side as the capacity of the pump body is changed from the planetary zero output capacity to the first pump capacity, wherein, when the speed-change operating member is positioned in a zero speed position, the control device operates the motor-side output adjusting member so that the motor body has the low-speed motor capacity while operating the pump-side output adjusting member so that the pump body has the planetary zero output capacity, wherein, when the vehicle traveling speed detected by the vehicle traveling speed sensor is equal to or lower than a forward-side switching speed that is realized by the motor body being set to the low-speed motor capacity and the pump body being set to a predetermined forward-side pump switching capacity, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the low-speed motor capacity, wherein, when the vehicle traveling speed reaches the forward-side switching speed from the low-speed side, in a case where the speed-change operating member is operated from the zero speed position to the forward side, the control device operates the motor-side output adjusting member so that the capacity of the motor body changes from the low-speed motor capacity to the high-speed motor capacity and operating, at the same time, the pump-side output adjusting member so that the capacity of the pump body becomes a forward-side pump adjusting capacity that can maintain the vehicle traveling speed at the forward-side switching speed in a state of the motor body being set to the high-speed motor capacity, wherein, when the vehicle traveling speed is higher than the forward-side switching speed, in a case where the speed-change operating member is operated from the zero speed position to the forward side, the control device operates the pump-side output adjusting member so that the vehicle traveling speed increases and reduces in the forward side in accordance with the forward-side speed-increasing and forward-side speed-reducing operations of the speed-change operating member while operating the motor-side output adjusting member so that the motor body is fixed at the high-speed motor capacity, wherein, when the vehicle traveling speed reaches the forward-side switching speed from the high-speed side, in a case where the speed-change operating member is operated from the zero speed position to the forward side, the control device operates the motor-side output adjusting member so that the capacity of the motor body changes from the high-speed motor capacity to the low-speed motor capacity and operating, at the same time, the pump-side output adjusting member so that the capacity of the pump body changes from the pump adjusting capacity to the pump switching capacity, and wherein, when the speed-change operating member is operated to the rearward side, the control device operates the pump-side output adjusting member so that the vehicle traveling speed increases and reduces in the rearward side in accordance with the rearward-side speed-increasing and rearward-side speed-reducing operations of the speed-change operating member while operating the motor-side output adjusting member so that the motor body is fixed at the low-speed motor capacity.

* * * * *